(12) United States Patent
Si

(10) Patent No.: US 12,166,712 B2
(45) Date of Patent: Dec. 10, 2024

(54) METHOD AND APPARATUS OF PDCCH ENHANCEMENT FOR HIGHER FREQUENCY RANGE

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 17/590,736

(22) Filed: Feb. 1, 2022

(65) Prior Publication Data

US 2022/0263619 A1    Aug. 18, 2022

Related U.S. Application Data

(60) Provisional application No. 63/280,378, filed on Nov. 17, 2021, provisional application No. 63/270,811, filed on Oct. 22, 2021, provisional application No. 63/255,707, filed on Oct. 14, 2021, provisional application No. 63/253,828, filed on Oct. 8, 2021, provisional application No. 63/248,870, filed on Sep. 27, 2021, provisional application No. 63/240,592, filed on Sep. 3, 2021, provisional application No. 63/236,054, filed on Aug. 23, 2021, provisional (Continued)

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ......................... H04L 5/0048; H04W 72/0446
See application file for complete search history.

(56) References Cited

U.S. PATENT DOCUMENTS

| 2019/0098590 A1 | 3/2019 | Nam et al. | |
| 2023/0189129 A1* | 6/2023 | Liu | H04W 48/10 |
| | | | 455/434 |
| 2024/0031110 A1* | 1/2024 | Kim | H04W 48/10 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

(Continued)

*Primary Examiner* — Won Tae C Kim

(57) ABSTRACT

Methods and apparatuses for physical downlink control channel (PDCCH) enhancements in a wireless communication system. A method of operating a user equipment (UE) includes receiving a synchronization signals and physical broadcast channel (SS/PBCH) block and determining a set of configurations for a control resource set (CORESET #0) for a Type0-PDCCH. The set of configurations include a subcarrier spacing (SCS) for the CORESET #0 that is same as the SS/PBCH block; a multiplexing pattern between the CORESET #0 and the SS/PBCH block; a time domain offset (O) to determine slots including monitor occasions for the Type0-PDCCH; and an index of a starting symbol within at least one of the slots. For a first multiplexing pattern between the CORESET #0 and the SS/PBCH block, the time domain offset (O) is configurable based on the SCS of the CORSET #0. The method further includes receiving the Type0-PDCCH based on the set of configurations for CORESET #0.

18 Claims, 8 Drawing Sheets

Related U.S. Application Data application No. 63/163,264, filed on Mar. 19, 2021, provisional application No. 63/150,337, filed on Feb. 17, 2021.

(56) References Cited

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"5G; NR; Physical layer procedures for data (3GPP TS 38.214 version 16.4.0 Release 16)", ETSI TS 138 214 V16.4.0, Jan. 2021, 173 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

International Search Report and Written Opinion issued May 18, 2022 regarding Application No. PCT/KR2022/002331, 6 pages.

Moderator (Intel Corporation), "Summary #5 of email discussion on initial access aspect of NR extension up to 71 GHz", 3GPP TSG RAN WG1 Meeting #104-e, R1-2102238, Jan. 2021, 199 pages.

Zte et al., "Discussion on the initial access aspects for 52.6 to 71 GHz", 3GPP TSG RAN WG1 Meeting #104-e, R1-2100073, Jan. 2021, 10 pages.

Samsung, "Initial access aspects for NR from 52.6 GHz to 71 GHz", 3GPP TSG RAN WG1 #104-e, R1-2101194, Jan. 2021, 7 pages.

"3rd Generation Partnership Project; Technical Specification Group Radio Access Network; Study on supporting NR from 52.6 GHz to 71 GHz (Release 17)", 3GPP TR 38.808 V1.0.0, Dec. 2020, 153 pages.

Extended European Search Report issued Jun. 17, 2024 regarding Application No. 22756509.0, 9 pages.

Qualcomm Incorporated, "Initial access aspects for NR to support operation between 52.6 GHZ and 71 GHz", 3GPP TSG-RAN WG1 #104-e, R1-2101453, Jan. 2021, 14 pages.

\* cited by examiner

METHOD AND APPARATUS OF PDCCH ENHANCEMENT FOR HIGHER FREQUENCY RANGE

CROSS-REFERENCE TO RELATED APPLICATIONS AND CLAIM OF PRIORITY

The present application claims priority to:
U.S. Provisional Patent Application No. 63/150,337, filed on Feb. 17, 2021;
U.S. Provisional Patent Application No. 63/163,264 filed on Mar. 19, 2021;
U.S. Provisional Patent Application No. 63/236,054, filed on Aug. 23, 2021;
U.S. Provisional Patent Application No. 63/240,592, filed on Sep. 3, 2021;
U.S. Provisional Patent Application No. 63/248,870, filed on Sep. 27, 2021;
U.S. Provisional Patent Application No. 63/253,828, filed on Oct. 8, 2021;
U.S. Provisional Patent Application No. 63/255,707, filed on Oct. 14, 2021;
U.S. Provisional Patent Application No. 63/270,811, filed on Oct. 22, 2021; and
U.S. Provisional Patent Application No. 63/280,378, filed on Nov. 17, 2021. The content of the above-identified patent document is incorporated herein by reference.

TECHNICAL FIELD

The present disclosure relates generally to wireless communication systems and, more specifically, the present disclosure relates to physical downlink control channel (PDCCH) enhancements in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to PDCCH enhancement in a wireless communication system.

In one embodiment, a base station (BS) in a wireless communication system is provided. The BS includes a processor configured to determine a set of configurations for a control resource set (CORESET #0) for a Type0-PDCCH. The set of configurations include a subcarrier spacing (SCS) for the CORESET #0 that is same as a SCS of a synchronization signals and physical broadcast channel (SS/PBCH) block; a multiplexing pattern between the CORESET #0 and the SS/PBCH block; a time domain offset (O) to determine slots to transmit the Type0-PDCCH; and an index of a starting symbol within at least one of the slots to transmit the Type0-PDCCH. For a first multiplexing pattern between the CORESET #0 and the SS/PBCH block, the time domain offset (O) is configurable as a value from {0, 5, X, 5+X}, where X is determined based on the SCS of the CORSET #0. The BS further includes a transceiver operably coupled to the processor. The transceiver is configured to transmit the SS/PBCH block; and transmit, over a downlink channel, the Type0-PDCCH based on the set of configurations for the CORESET #0.

In another embodiment, a user equipment (UE) in a wireless communication system is provided. The UE includes a transceiver configured to receive, from a BS, a SS/PBCH block; and a processor operably coupled to the transceiver. The processor is configured to determine a set of configurations for a CORESET #0 for a Type0-PDCCH. The set of configurations include: a SCS for the CORESET #0 that is same as a SCS of the SS/PBCH block; a multiplexing pattern between the CORESET #0 and the SS/PBCH block; a time domain offset (O) to determine slots including monitor occasions for the Type0-PDCCH; and an index of a starting symbol within at least one of the slots including the monitor occasions for the Type0-PDCCH. For a first multiplexing pattern between the CORESET #0 and the SS/PBCH block, the time domain offset (O) is configurable as a value from {0, 5, X, 5+X}, where X is determined based on the SCS of the CORSET #0. The transceiver is further configured to receive, over a downlink channel, the Type0-PDCCH based on the set of configurations for CORESET #0.

In yet another embodiment, a method of operating a UE in a wireless communication system. The method includes receiving, from a BS, a SS/PBCH block and determining a set of configurations for a CORESET #0 for a Type0-PDCCH. The set of configurations include a SCS for the CORESET #0, that is same as a SCS of the SS/PBCH block; a multiplexing pattern between the CORESET #0 and the SS/PBCH block; a time domain offset (O) to determine slots including monitor occasions for the Type0-PDCCH; and an index of a starting symbol within at least one of the slots including the monitor occasions for the Type0-PDCCH. For a first multiplexing pattern between the CORESET #0 and the SS/PBCH block, the time domain offset (O) is configurable as a value from {0, 5, X, 5+X}, where X is determined based on the SCS of the CORSET #0. The method further includes receiving, over a downlink channel, the Type0-PDCCH based on the set of configurations for CORESET #0.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.4.0, "NR; Physical Layer Procedures for Data"; and 3GPP TS 38.331 v16.4.1, "NR; Radio Resource Control (RRC) Protocol Specification."

Figure 1:
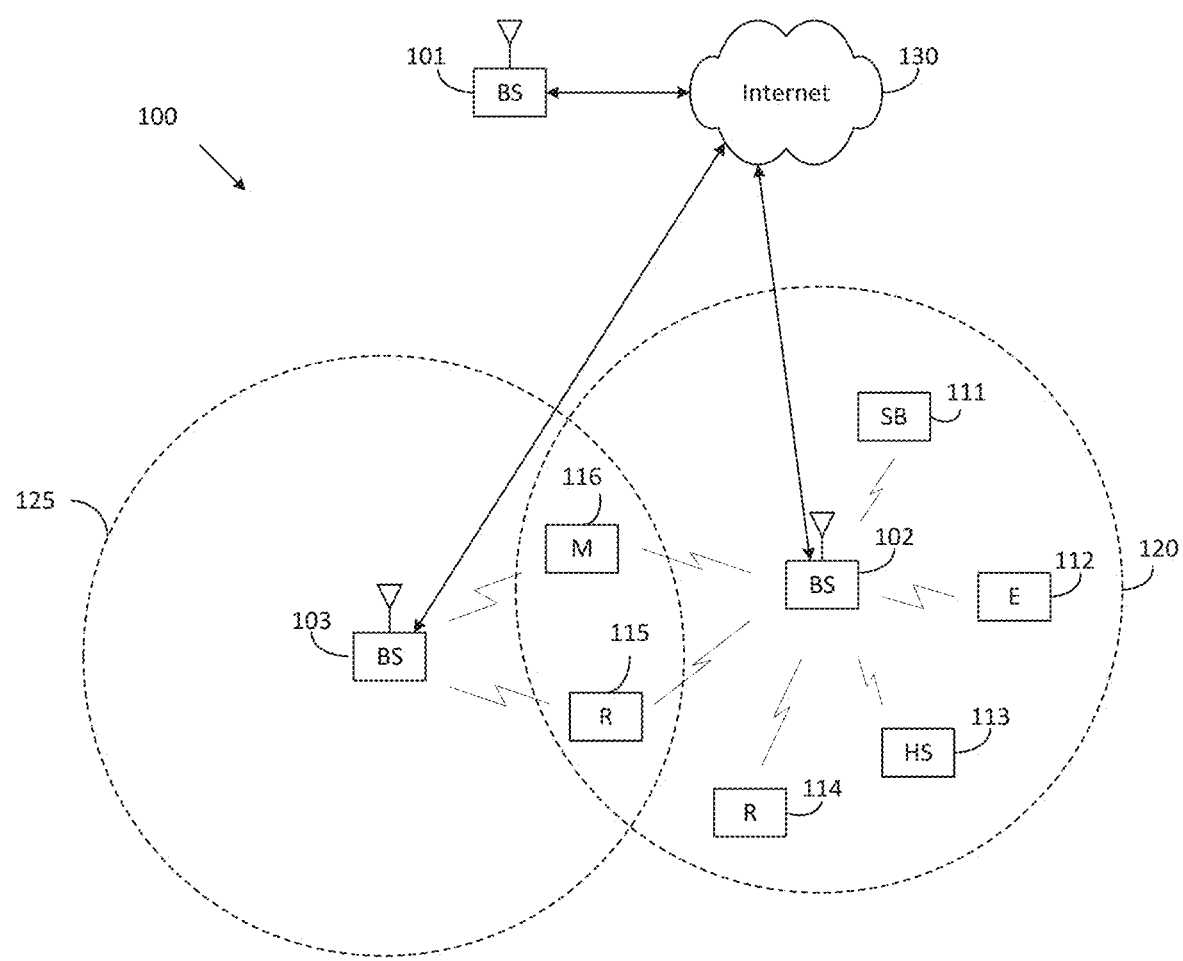
FIG. 1 illustrates an example of wireless network according to embodiments of the present disclosure.
Figure 2:
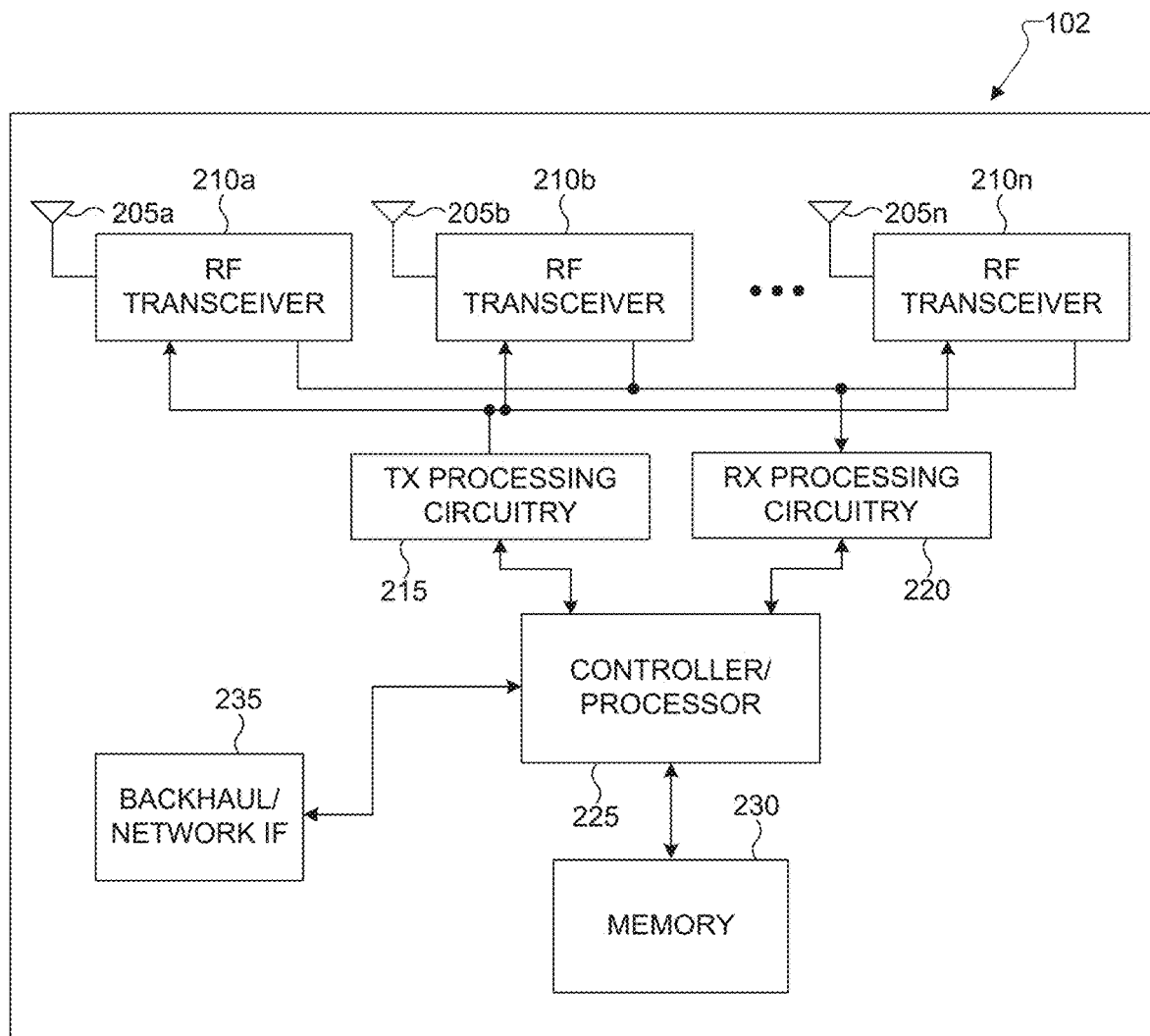
FIG. 2 illustrates an example of gNB according to embodiments of the present disclosure.
Figure 3:
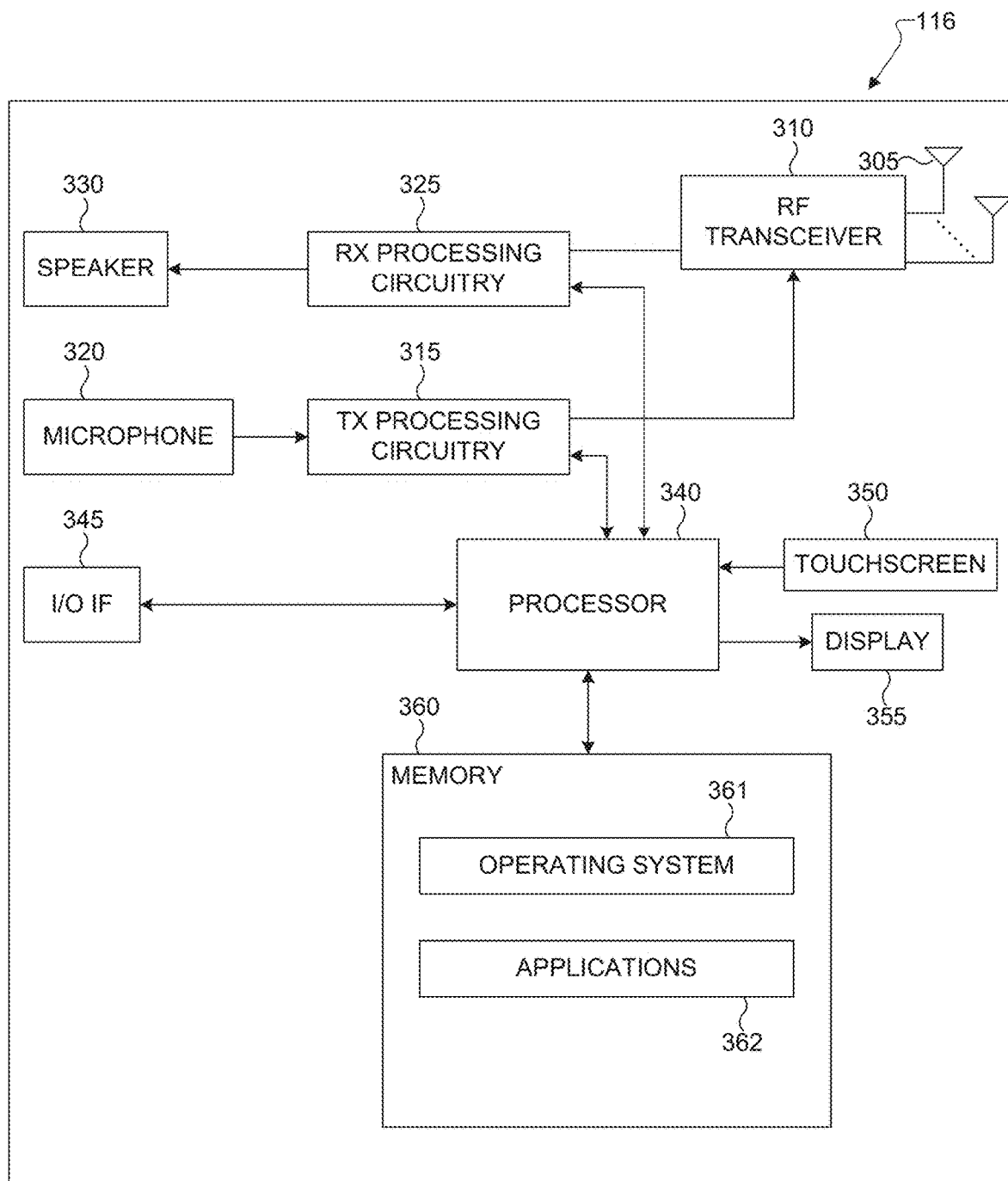
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for PDCCH enhancement in a wireless communication system. In certain embodiments, and one or more of the gNBs 101-103 includes circuitry, programing, or a combination thereof, for PDCCH enhancement in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) signals and the transmission of downlink (DL) signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/ processor 225 could support PDCCH enhancement in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals and the transmission of UL signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for PDCCH enhancement in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a DL that refers to transmissions from a base station or one or more transmission points to UEs and a UL that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or PDCCHs. A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as a UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as RRC signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4A:
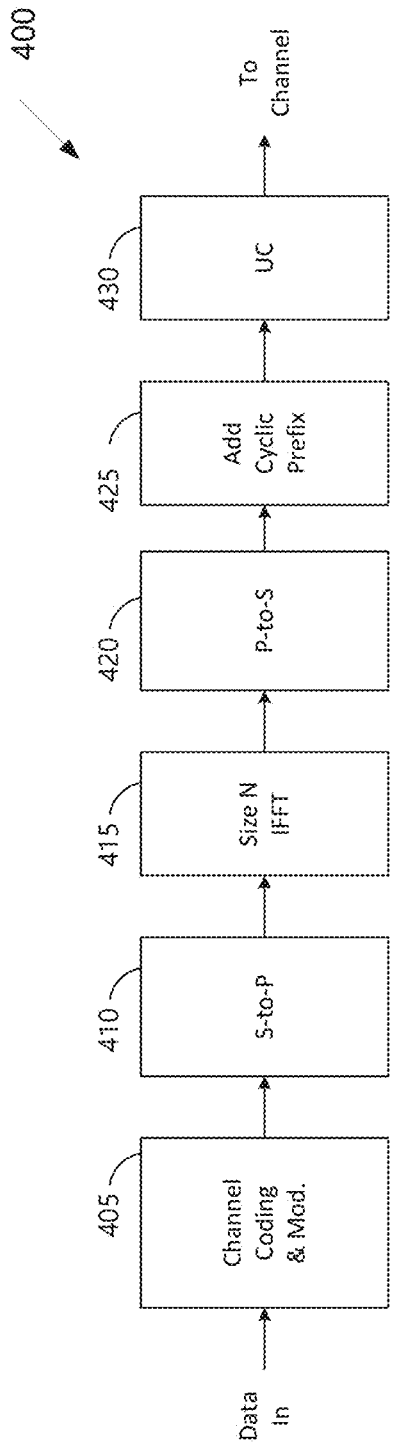
FIGS. 4A and 4B illustrate example of wireless transmit and receive paths according to this disclosure.
Figure 4B:
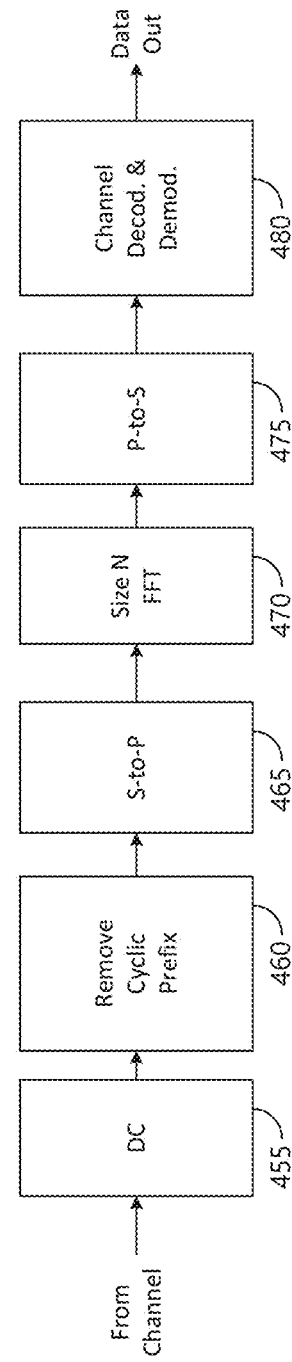

FIGS. 4A and 4B illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

Figure 5:
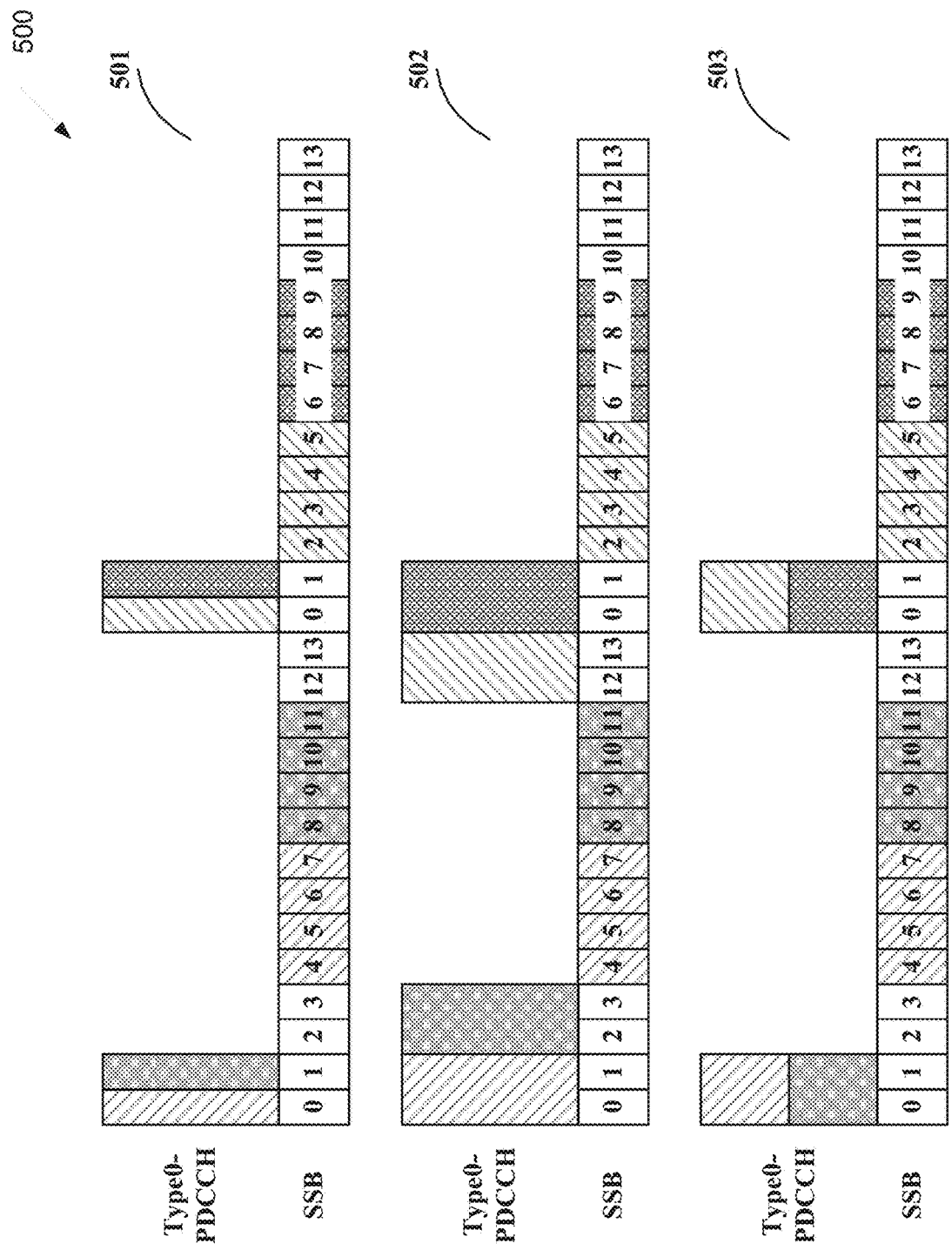
FIG. 5 illustrate an example of Type0-PDCCH in Pattern 2 according to embodiments of the present disclosure.

The transmit path 400 as illustrated in FIG. 4A includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4A, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4A and FIG. 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4A and FIG. 4B illustrate examples of wireless transmit and receive paths, various changes may be made to FIG. 4A and FIG. 4B. For example, various components in FIG. 4A and FIG. 4B can be combined, further subdivided, or omitted and additional components can be added according to particular needs. Also, FIG. 4A and FIG. 4B are meant to illustrate examples of the types of transmit and receive paths that can be used in a wireless network. Any other suitable architectures can be used to support wireless communications in a wireless network.

The present disclosure focuses on enhancement to Type0-PDCCH monitoring for higher frequency range, e.g., for existing supported SCS as 120 kHz and new SCSs as 480 kHz and 960 kHz.

In particular, the present disclosure includes the following components: (1) enhancement to Type0-PDCCH in Pattern 1; (2) enhancement to Type0-PDCCH in Pattern 2 for {120, 120} kHz; (3) enhancement to Type0-PDCCH in Pattern 2 for {480, 480} kHz and/or {960, 960} kHz; (4) enhancement to Type0-PDCCH in Pattern 3 for {120, 120} kHz; (5) enhancement to Type0-PDCCH in Pattern 3 for {480, 480} kHz and/or {960, 960} kHz; and (6) span based Type0-PDCCH monitoring.

In NR Rel-15 and Rel-16, the configuration of Type0-PDCCH is determined according to the multiplexing pattern of synchronization signal/physical broadcasting channel (SS/PBCH) block and control resource set #0 (CORESET #0).

For an operation with shared spectrum channel access and for the SS/PBCH block and CORESET multiplexing pattern 1, a UE monitors PDCCH in the Type0-PDCCH CSS set over slots that include Type0-PDCCH monitoring occasions associated with SS/PBCH blocks that are quasi co-located with the SS/PBCH block that provides a CORESET for Type0-PDCCH CSS set with respect to average gain, quasi co-location "typeA" and "typeD" properties, when applicable.

For a candidate SS/PBCH block index $\bar{i}$, where $0 \leq \bar{i} \leq \bar{L}_{max}-1$, two consecutive slots starting from slot $n_0$ include the associated Type0-PDCCH monitoring occasions. The UE determines an index of slot $n_0$ as $n_0 = (O \cdot 2^\mu + \lfloor \bar{i} \cdot M \rfloor)$ mod $N_{slot}^{frame,\mu}$ that is in a frame with system frame number (SFN) $SFN_C$ satisfying $SFN_C$ mod $2=0$ if $\lfloor (O \cdot 2^\mu \lfloor \bar{i} \cdot M \rfloor)/N_{slot}^{frame,\mu} \rfloor$ mod $2=0$, or in a frame with SFN satisfying $SFN_C$ mod $2=1$ if $\lfloor (O \cdot 2^\mu + \lfloor \bar{i} \cdot M \rfloor)/N_{slot}^{frame,\mu} \rfloor$ mod $2=1$.

For an operation without shared spectrum channel access and for the SS/PBCH block and CORESET multiplexing pattern 1, a UE monitors PDCCH in the Type0-PDCCH CSS set over two consecutive slots starting from slot $n_0$. For SS/PBCH block with index i, the UE determines an index of slot $n_0$ as $n_0 = (O \cdot 2^\mu + \lfloor i \cdot M \rfloor)$ mod $N_{slot}^{frame,\mu}$ that is in a frame with system frame number (SFN) $SFN_C$ satisfying $SFN_C$ mod $2=0$ if $\lfloor (O \cdot 2^\mu + \lfloor i \cdot M \rfloor)/N_{slot}^{frame,\mu} \rfloor$ mod $2=0$, or in a frame with SFN satisfying $SFN_C$ mod $2=1$ if $\lfloor (O \cdot 2^\mu + \lfloor i \cdot M \rfloor)/N_{slot}^{frame,\mu} \rfloor$ mod $2=1$.

For the SS/PBCH block and CORESET multiplexing patterns 2 and 3, a UE monitors PDCCH in the Type0-PDCCH CSS set over one slot with Type0-PDCCH CSS set periodicity equal to the periodicity of SS/PBCH block.

For higher frequency range, e.g., 52.6 GHz to 71 GHz, new subcarrier spacings such as 480 kHz and/or 960 kHz can be supported, and enhancement to Type0-PDCCH to support the new SCSs is needed.

Although exemplary descriptions and embodiments to follow assume OFDM or OFDMA, this disclosure can be extended to other OFDM-based transmission waveforms or multiple access schemes such as filtered OFDM (F-OFDM).

In Rel-15, for multiplexing pattern of SS/PBCH block and CORESET #0 as Pattern 1, the parameter O in determining the index of slot $n_0$ can take value from $\{0, 2.5, 5, 7.5\}$ for FR2, and the term $O \cdot 2^\mu$ corresponds to a fixed absolute time for a given value of O regardless of the SCS of PDCCH in CORESET #0. For 52.6 to 71 GHz, if 480 kHz or 960 kHz SS/PBCH block is supported, enhancement to the parameter O is needed.

In one embodiment, for multiplexing pattern of SS/PBCH block and CORESET #0 as Pattern 1, the parameter O in determining the index of slot $n_0$ can depend on the SCS of PDCCH in CORESET #0, such that the term $O \cdot 2^\mu$ corresponds to different absolute time for different SCS of PDCCH in CORESET #0. In one further consideration, the revision can be applicable to some particular value of O.

In one example, the parameter O in determining the index of slot $n_0$ can take value from $\{0, 2.5, 5, 7.5\}$ for SCS of SS/PBCH block as 120 kHz.

In one example, in the configuration table for Type0-PDCCH, when the configuration is provided by MIB, the value of O can be configured as $5 \cdot 2^{-\nu}$, wherein $2^{-\nu}$ is the ratio between 120 kHz SCS and the SCS of SS/PBCH block. The value of v depends on the supported SCS of SS/PBCH block, for instance, v=1, 2, 3 or v=2, 3. The example can also be illustrated as in TABLE 1.

TABLE 1

Example of value of O corresponding to different SCS.

| SCS of SS/PBCH block | O |
|---|---|
| 240 kHz | 2.5 |
| 480 kHz | 1.25 |
| 960 kHz | 0.625 |

In another example, in the configuration table for Type0-PDCCH, when the configuration is provided by MIB, the value of O can be configured as $5+5 \cdot 2^{-\nu}$, wherein $2^{-\nu}$ is the ratio between 120 kHz SCS and the SCS of SS/PBCH block. The value of v depends on the supported SCS of SS/PBCH block, for instance, v=1, 2, 3 or v=2, 3. The example can also be illustrated as in TABLE 2.

TABLE 2

Example of value of O corresponding to different SCS.

| SCS of SS/PBCH block | O |
|---|---|
| 240 kHz | 7.5 |
| 480 kHz | 6.25 |
| 960 kHz | 5.625 |

In yet another example, in the configuration table for Type0-PDCCH, when the configuration is provided by MIB, the value of O can be configured as $2.5 \cdot 2^{-\nu}$, wherein $2^{-\nu}$ is the ratio between 120 kHz SCS and the SCS of SS/PBCH block. The value of v depends on the supported SCS of SS/PBCH block, for instance, v=1, 2, 3 or v=2, 3. The example can also be illustrated as in TABLE 3.

TABLE 3

Example of value of O corresponding to different SCS.

| SCS of SS/PBCH block | O |
|---|---|
| 240 kHz | 5 |
| 480 kHz | 2.5 |
| 960 kHz | 1.25 |

In yet another example, in the configuration table for Type0-PDCCH, when the configuration is provided by MIB, the value of O can be configured as $5+2 \cdot 5 \cdot 2^{-v}$, wherein $2^{-v}$ is the ratio between 120 kHz SCS and the SCS of SS/PBCH block. The value of v depends on the supported SCS of SS/PBCH block, for instance, v=2, 3. The example can also be illustrated as in TABLE 4.

TABLE 4

Example of value of O corresponding to different SCS.

| SCS of SS/PBCH block | O |
|---|---|
| 480 kHz | 7.5 |
| 960 kHz | 6.25 |

In the examples, $2^{-v}$ is the ratio between 120 kHz SCS and the SCS of SS/PBCH block. For instance, v=1 if the SCS of SS/PBCH block is 240 kHz, v=2 if the SCS of SS/PBCH block is 480 kHz, and v=3 if the SCS of SS/PBCH block is 960 kHz. In one further consideration, the SCS of SS/PBCH block can be the same as the SCS of PDCCH in CORESET #0 (i.e., the "SCS of SS/PBCH block" in the tables of this embodiment can be replaced as "SCS of PDCCH in CORESET #0"), then the dependency on the SCS of SS/PBCH block is same as the dependency on the SCS of PDCCH in CORESET #0. In this case, v=μ−3, and it's equivalent as modifying the term $O \cdot 2^\mu$ in determining the index of slot $n_0$ to $O \cdot 2^3$, such that the corresponding absolute time duration is not fixed, but changing with the SCS of SS/PBCH block (or SCS of PDCCH in CORESET #0).

For one instance of this embodiment based on the examples, the configurable value of O can be $\{0, 5, 5 \cdot 2^{-v}, 5+5 \cdot 2^{-v}\}$, wherein v=1, 2, 3 (e.g., for 240, 480, and 960 kHz SCS, respectively), or v=2, 3 (e.g., for 480, and 960 kHz SCS, respectively), or v=3 (e.g., for 960 kHz SCS). In one example, this is supported for an operation with and without shared spectrum channel access. In another example, this is supported for an operation without shared spectrum channel access only.

For another instance of this embodiment based on the examples, the configurable value of O can be $\{0, 5, 2.5, 7.5, 5 \cdot 2^{-v}, 5+5 \cdot 2^{-v}\}$, wherein v=2, 3 (e.g., for 480, and 960 kHz SCS, respectively), or v=3 (e.g., for 960 kHz SCS).

For yet another instance of this embodiment based on the examples, the configurable value of O can be $\{0, 5, 2 \cdot 5 \cdot 2^{-v}, 5+2 \cdot 5 \cdot 2^{-v}\}$, wherein v=1, 2, 3 (e.g., for 240, 480, and 960 kHz SCS, respectively), or v=2, 3 (e.g., for 480, and 960 kHz SCS, respectively), or v=3 (e.g., for 960 kHz SCS). In one example, this is supported for an operation with and without shared spectrum channel access. In another example, this is supported for an operation with shared spectrum channel access only.

For yet another instance of this embodiment based on the examples, the configurable value of O can be $\{0, 5, 2.5, 7.5, 2 \cdot 5 \cdot 2^{-v}, 5+2 \cdot 5 \cdot 2^{-v}\}$, wherein v=2, 3 (e.g., for 480, and 960 kHz SCS, respectively), or v=3 (e.g., for 960 kHz SCS).

For yet another instance of this embodiment based on the examples, the configurable value of O can be $\{0, 5, 2.5, 7.5\}$ for 120 kHz SCS and/or 240 kHz SCS.

For yet another instance of this embodiment based on the examples, the configurable value of O can be $\{0, 5\}$ for 120 kHz SCS.

One example Type0-PDCCH configuration for Pattern 1 and all supported SCSs in higher frequency range is shown in TABLE 5, wherein for one sub-example (e.g., for an operation without shared spectrum channel access only or for both operations with and without shared spectrum channel access), $C_1$=1 for 120 kHz SCS, $C_1$=2 for 480 kHz SCS, $C_1$=4 for 960 kHz SCS; and for another sub-example (e.g., for an operation with shared spectrum channel access only or for both operations with and without shared spectrum channel access), $C_1$=1 for 120 kHz SCS, $C_1$=1 for 480 kHz SCS, $C_1$=2 for 960 kHz SCS. In one variant of this example, $N_{symb}^{CORESET}$ can be replaced by $N_{symb}^{CORESET}+1$, e.g., if the beam sweeping time of a gNB can be larger than a symbol.

TABLE 5

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {$N_{symb}^{CORESET}$, if i is odd} |
| 3 | 0 | 1 | 2 | 0 |
| 4 | 5 | 1 | 1 | 0 |
| 5 | 5 | 2 | 1/2 | {0, if i is even}, {7, if i is odd} |
| 6 | 5 | 2 | 1/2 | {0, if i is even}, {$N_{symb}^{CORESET}$, if i is odd} |
| 7 | 5 | 1 | 2 | 0 |
| 8 | $2.5/C_1$ | 1 | 1 | 0 |
| 9 | $2.5/C_1$ | 2 | 1/2 | {0, if i is even}, {7, if i is odd} |
| 10 | $2.5/C_1$ | 2 | 1/2 | {0, if i is even}, {$N_{symb}^{CORESET}$, if i is odd} |
| 11 | $5 + 2.5/C_1$ | 1 | 1 | 0 |
| 12 | $5 + 2.5/C_1$ | 2 | 1/2 | {0, if i is even}, {7, if i is odd} |
| 13 | $5 + 2.5/C_1$ | 2 | 1/2 | {0, if i is even}, {$N_{symb}^{CORESET}$, if i is odd} |
| 14 | Reserved | | | |
| 15 | Reserved | | | |

Another example Type0-PDCCH configuration for Pattern 1 and all supported SCSs in higher frequency range is shown in TABLE 6, wherein for one sub-example (e.g., for an operation without shared spectrum channel access only or for both operations with and without shared spectrum channel access), $C_1$=1 for 120 kHz SCS, $C_1$=2 for 480 kHz SCS, $C_1$=4 for 960 kHz SCS; and for another sub-example (e.g., for an operation with shared spectrum channel access only or for both operations with and without shared spectrum channel access), $C_1$=1 for 120 kHz SCS, $C_1$=1 for 480 kHz SCS, $C_1$=2 for 960 kHz SCS. In one variant of this example, $N_{symb}^{CORESET}$ can be replaced by $N_{symb}^{CORESET}+1$, e.g., if the beam sweeping time of a gNB can be larger than a symbol.

TABLE 6

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {$N_{symb}^{CORESET}$, if i is odd} |
| 3 | 0 | 1 | 2 | 0 in slot with index $n_0$ |
| 4 | 0 | 1 | 2 | 0 in slot with index $n_0 + 1$ |
| 5 | 5 | 1 | 1 | 0 |
| 6 | 5 | 2 | 1/2 | {0, if i is even}, {7, if i is odd} |

TABLE 6-continued

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 7 | 5 | 2 | 1/2 | {0, if i is even}, {$N_{symb}^{CORESET}$, if i is odd} |
| 8 | 5 | 1 | 2 | 0 in slot with index $n_0$ |
| 9 | 5 | 1 | 2 | 0 in slot with index $n_0 + 1$ |
| 10 | $2.5/C_1$ | 1 | 1 | 0 |
| 11 | $2.5/C_1$ | 2 | 1/2 | {0, if i is even}, {7, if i is odd} |
| 12 | $2.5/C_1$ | 2 | 1/2 | {0, if i is even}, {$N_{symb}^{CORESET}$, if i is odd} |
| 13 | $5 + 2.5/C_1$ | 1 | 1 | 0 |
| 14 | $5 + 2.5/C_1$ | 2 | 1/2 | {0, if i is even}, {7, if i is odd} |
| 15 | $5 + 2.5/C_1$ | 2 | 1/2 | {0, if i is even}, ($N_{symb}^{CORESET}$, if i is odd} |

Yet another example Type0-PDCCH configuration for Pattern 1 and all supported SCSs in higher frequency range is shown in TABLE 7, wherein for one sub-example (e.g., for an operation without shared spectrum channel access only or for both operations with and without shared spectrum channel access), $C_1=1$ for 120 kHz SCS, $C_1=2$ for 480 kHz SCS, $C_1=4$ for 960 kHz SCS; and for another sub-example (e.g., for an operation with shared spectrum channel access only or for both operations with and without shared spectrum channel access), $C_1=1$ for 120 kHz SCS, $C_1=1$ for 480 kHz SCS, $C_1=2$ for 960 kHz SCS.

TABLE 7

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 1 | 2 | 0 |
| 3 | 5 | 1 | 1 | 0 |
| 4 | 5 | 2 | 1/2 | {0, if i is even}, {7, if i is odd} |
| 5 | 5 | 1 | 2 | 0 |
| 6 | $2.5/C_1$ | 1 | 1 | 0 |
| 7 | $2.5/C_1$ | 2 | 1/2 | {0, if i is even}, {7, if i is odd} |
| 8 | $5 + 2.5/C_1$ | 1 | 1 | 0 |
| 9 | $5 + 2.5/C_1$ | 2 | 1/2 | {0, if i is even}, {7, if i is odd} |
| 10 | | | | Reservec |
| 11 | | | | Reserved |
| 12 | | | | Reserved |
| 13 | | | | Reserved |
| 14 | | | | Reserved |
| 15 | | | | Reserved |

Yet another example Type0-PDCCH configuration for Pattern 1 and all supported SCSs in higher frequency range is shown in TABLE 8, wherein for one sub-example (e.g., for an operation without shared spectrum channel access only or for both operations with and without shared spectrum channel access), $C_1=1$ for 120 kHz SCS, $C_1=2$ for 480 kHz SCS, $C_1=4$ for 960 kHz SCS; and for another sub-example (e.g., for an operation with shared spectrum channel access only or for both operations with and without shared spectrum channel access), $C_1=1$ for 120 kHz SCS, $C_1=1$ for 480 kHz SCS, $C_1=2$ for 960 kHz SCS.

TABLE 8

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 1 | 2 | 0 in slot with index n0 |
| 3 | 0 | 1 | 2 | 0 in slot with index $n_0 + 1$ |
| 4 | 5 | 1 | 1 | 0 |
| 5 | 5 | 2 | 1/2 | {0, if i is even}, {7, if i is odd} |
| 6 | 5 | 1 | 2 | 0 in slot with index $n_0$ |
| 7 | 5 | 1 | 2 | 0 in slot with index $n_0 + 1$ |
| 8 | $2.5/C_1$ | 1 | 1 | 0 |
| 9 | $2.5/C_1$ | 2 | 1/2 | {0, if i is even}, {7, if i is odd} |
| 10 | $5 + 2.5/C_1$ | 1 | 1 | 0 |
| 11 | $5 + 2.5/C_1$ | 2 | 1/2 | {0, if i is even}, {7, if i is odd) |
| 12 | | | | Reserved |
| 13 | | | | Reserved |
| 14 | | | | Reserved |
| 15 | | | | Reserved |

One example Type0-PDCCH configuration for Pattern 1 and 120 kHz SCS in higher frequency range is shown in TALE 9. For this example, there are at most 8 configurations for 120 kHz SCS, and one bit from the higher layer parameter searchSpaceZero (e.g., the leftmost bit or rightmost bit or MSB or LSB) can be reserved for other purpose (e.g., indicating the QCL parameter for SSB). In one variant of this example, $N_{symb}^{CORESET}$ can be replaced by $N_{symbol}^{CORESET}+1$, e.g., if the beam sweeping time of a gNB can be larger than a symbol.

TABLE 9

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {$N_{symb}^{CORESET}$, if i is odd} |
| 3 | 0 | 1 | 2 | 0 |
| 4 | 5 | 1 | 1 | 0 |
| 5 | 5 | 2 | 1/2 | {0, if i is even}, {7, if i is odd} |
| 6 | 5 | 2 | 1/2 | (0, if i is even}, {$N_{symb}^{CORESET}$, if i is odd} |
| 7 | 5 | 1 | 2 | 0 |
| 8 | | | | Reserved |
| 9 | | | | Reserved |
| 10 | | | | Reserved |
| 11 | | | | Reserved |
| 12 | | | | Reserved |
| 13 | | | | Reserved |
| 14 | | | | Reserved |
| 15 | | | | Reserved |

Another example Type0-PDCCH configuration for Pattern 1 and 120 kHz SCS in higher frequency range is shown in TABLE 10. For this example, there are at most 8 configurations for 120 kHz SCS, and one bit from the higher layer parameter searchSpaceZero (e.g., the leftmost bit or rightmost bit or MSB or LSB) can be reserved for other purpose (e.g., indicating the QCL parameter for SSB).

TABLE 10

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 1 | 2 | 0 in slot with index $n_0$ |
| 3 | 0 | 1 | 2 | 0 in slot with index $n_0$ + 1 |
| 4 | 5 | 1 | 1 | 0 |
| 5 | 5 | 2 | 1/2 | {0, if i is even}, {7, if i is odd} |
| 6 | 5 | 1 | 2 | 0 in slot with index $n_0$ |
| 7 | 5 | 1 | 2 | 0 in slot with index $n_0$ + 1 |
| 8 | | | | Reserved |
| 9 | | | | Reserved |
| 10 | | | | Reserved |
| 11 | | | | Reserved |
| 12 | | | | Reserved |
| 13 | | | | Reserved |
| 14 | | | | Reserved |
| 15 | | | | Reserved |

Yet another example Type0-PDCCH configuration for Pattern 1 and 120 kHz SCS in higher frequency range is shown in TABLE 11. For this example, there are at most 6 configurations for 120 kHz SCS, and one bit from the higher layer parameter searchSpaceZero (e.g., the leftmost bit or rightmost bit or MSB or LSB) can be reserved for other purpose (e.g., indicating the QCL parameter for SSB).

TABLE 11

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 1 | 2 | 0 |
| 3 | 5 | 1 | 1 | 0 |
| 4 | 5 | 2 | 1/2 | {0, if i is even), {7, if i is odd} |
| 5 | 5 | 1 | 2 | 0 |
| 6 | | | | Reserved |
| 7 | | | | Reserved |
| 8 | | | | Reserved |
| 9 | | | | Reserved |
| 10 | | | | Reserved |
| 11 | | | | Reserved |
| 12 | | | | Reserved |
| 13 | | | | Reserved |
| 14 | | | | Reserved |
| 15 | | | | Reserved |

Yet another example Type0-PDCCH configuration for Pattern 1 and 120 kHz SCS in higher frequency range is shown in TABLE 12. In one variant of this example, $N_{symb}^{CORESET}$ can be replaced by $N_{symb}^{CORESET}+1$, e.g., if the beam sweeping time of a gNB can be larger than a symbol.

TABLE 12

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {$N_{symb}^{CORESET}$, if i is odd} |
| 3 | 0 | 1 | 2 | 0 in slot with index $n_0$ |
| 4 | 0 | 1 | 2 | 0 in slot with index $n_0$ + 1 |
| 5 | 5 | 1 | 1 | 0 |
| 6 | 5 | 2 | 1/2 | {0, if i is even}, {7, if i is odd} |
| 7 | 5 | 2 | 1/2 | {0, if i is even}, {$N_{symb}^{CORESET}$, if i is odd} |
| 8 | 5 | 1 | 2 | 0 in slot with index $n_0$ |
| 9 | 5 | 1 | 2 | 0 in slot with index $n_0$ + 1 |
| 10 | | | | Reserved |
| 11 | | | | Reserved |
| 12 | | | | Reserved |
| 13 | | | | Reserved |
| 14 | | | | Reserved |
| 15 | | | | Reserved |

One example Type0-PDCCH configuration for Pattern 1 and 480/960 kHz SCSs in higher frequency range is shown in TABLE 13, wherein for one sub-example (e.g., for an operation without shared spectrum channel access only or for both operations with and without shared spectrum channel access), $C_1=2$ for 480 kHz SCS, $C_1=4$ for 960 kHz SCS; and for another sub-example (e.g., for an operation with shared spectrum channel access only or for both operations with and without shared spectrum channel access), $C_1=1$ for 480 kHz SCS, $C_1=2$ for 960 kHz SCS. In one variant of this example, $N_{symb}^{CORESET}$ be replaced by $N_{symb}^{CORESET}+1$, e.g., if the beam sweeping time of a gNB can be larger than a symbol.

TABLE 13

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd) |
| 2 | 0 | 2 | 1/2 | {0, if i is even}, {$N_{symb}^{CORESET}$, if i is odd} |
| 3 | 0 | 1 | 2 | 0 |
| 4 | 5 | 1 | 1 | 0 |
| 5 | 5 | 2 | 1/2 | {0, if i is even}, {7, if i is odd} |
| 6 | 5 | 2 | 1/2 | {0, if i is even}, {$N_{symb}^{CORESET}$, if i is odd} |
| 7 | 5 | 1 | 2 | 0 |
| 8 | $2.5/C_1$ | 1 | 1 | 0 |
| 9 | $2.5/C_1$ | 2 | 1/2 | {0, if i is even}, {7, if i is odd} |
| 10 | $2.5/C_1$ | 2 | 1/2 | {0, if i is even}, {$N_{symb}^{CORESET}$, if i is odd} |
| 11 | $5 + 2.5/C_1$ | 1 | 1 | 0 |
| 12 | $5 + 2.5/C_1$ | 2 | 1/2 | {0, if i is even}, {7, if i is odd} |
| 13 | $5 + 2.5/C_1$ | 2 | 1/2 | {0, if i is even}, {$N_{symb}^{CORESET}$, if i is odd} |
| 14 | | | | Reserved |
| 15 | | | | Reserved |

Another example Type0-PDCCH configuration for Pattern 1 and 480/960 kHz SCSs in higher frequency range is shown in TABLE 14, wherein for one sub-example (e.g., for an operation without shared spectrum channel access only or for both operations with and without shared spectrum channel access), $C_1=2$ for 480 kHz SCS, $C_1=4$ for 960 kHz SCS; and for another sub-example (e.g., for an operation with shared spectrum channel access only or for both operations with and without shared spectrum channel access), $C_1=1$ for 480 kHz SCS, $C_1=2$ for 960 kHz SCS. In one variant of this example, $N_{symb}^{CORESET}$ be replaced by $N_{symb}^{CORESET}+1$, e.g., if the beam sweeping time of a gNB can be larger than a symbol.

TABLE 14

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {$N_{symb}^{CORESET}$, if i is odd} |
| 3 | 0 | 1 | 2 | 0 in slot with index $n_0$ |
| 4 | 0 | 1 | 2 | 0 in slot with index $n_0 + 1$ |
| 5 | 5 | 1 | 1 | 0 |
| 6 | 5 | 2 | 1/2 | {0, if i is even}, {7, if i is odd} |
| 7 | 5 | 2 | 1/2 | {0, if i is even}, {$N_{symb}^{CORESET}$, if i is odd} |
| 8 | 5 | 1 | 2 | 0 in slot with index $n_0$ |
| 9 | 5 | 1 | 2 | 0 in slot with index $n_0 + 1$ |
| 10 | $2.5/C_1$ | 1 | 1 | 0 |
| 11 | $2.5/C_1$ | 2 | 1/2 | {0, if i is even}, {7, if i is odd} |
| 12 | $2.5/C_1$ | 2 | 1/2 | {0, if i is even}, {$N_{symb}^{CORESET}$, if i is odd} |
| 13 | $5 + 2.5/C_1$ | 1 | 1 | 0 |
| 14 | $5 + 2.5/C_1$ | 2 | 1/2 | {0, if i is even}, {7, if i is odd} |
| 15 | $5 + 2.5/C_1$ | 2 | 1/2 | {0, if i is even}, {$N_{symb}^{CORESET}$, if i is odd} |

Yet another example Type0-PDCCH configuration for Pattern 1 and 480/960 kHz SCSs in higher frequency range is shown in TABLE 15, wherein for one sub-example (e.g., for an operation without shared spectrum channel access only or for both operations with and without shared spectrum channel access), $C_1=2$ for 480 kHz SCS, $C_1=4$ for 960 kHz SCS; and for another sub-example (e.g., for an operation with shared spectrum channel access only or for both operations with and without shared spectrum channel access), $C_1=1$ for 480 kHz SCS, $C_1=2$ for 960 kHz SCS.

TABLE 15

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 1 | 2 | 0 |
| 3 | 5 | 1 | 1 | 0 |
| 4 | 5 | 2 | 1/2 | {0, if i is even}, {7, if i is odd} |
| 5 | 5 | 1 | 2 | 0 |
| 6 | $2.5/C_1$ | 1 | 1 | 0 |
| 7 | $2.5/C_1$ | 2 | 1/2 | {0, if i is even}, {7, if i is odd} |
| 8 | $5 + 2.5/C_1$ | 1 | 1 | 0 |
| 9 | $5 + 2.5/C_1$ | 2 | 1/2 | {0, if i is even}, {7, if i is odd} |
| 10 | | | | Reserved |
| 11 | | | | Reserved |
| 12 | | | | Reserved |
| 13 | | | | Reserved |
| 14 | | | | Reserved |
| 15 | | | | Reserved |

Yet another example Type0-PDCCH configuration for Pattern 1 and 480/960 kHz SCSs in higher frequency range is shown in TABLE 16, wherein for one sub-example (e.g., for an operation without shared spectrum channel access only or for both operations with and without shared spectrum channel access), $C_1=2$ for 480 kHz SCS, $C_1=4$ for 960 kHz SCS; and for another sub-example (e.g., for an operation with shared spectrum channel access only or for both operations with and without shared spectrum channel access), $C_1=1$ for 480 kHz SCS, $C_1=2$ for 960 kHz SCS.

TABLE 16

Example parameters for PDCCH monitoring occasions for Type0-PDCCH CSS set - SS/PBCH block and CORESET multiplexing pattern 1 and higher frequency range.

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 0 | 1 | 2 | 0 in slot with index $n_0$ |
| 3 | 0 | 1 | 2 | 0 in slot with index $n_0 + 1$ |
| 4 | 5 | 1 | 1 | 0 |
| 5 | 5 | 2 | 1/2 | {0, if i is even}, {7, if i is odd} |
| 6 | 5 | 1 | 2 | 0 in slot with index $n_0$ |
| 7 | 5 | 1 | 2 | 0 in slot with index $n_0 + 1$ |
| 8 | $2.5/C_1$ | 1 | 1 | 0 |
| 9 | $2.5/C_1$ | 2 | 1/2 | {0, if i is even}, {7, if i is odd} |
| 10 | $5 + 2.5/C_1$ | 1 | 1 | 0 |
| 11 | $5 + 2.5/C_1$ | 2 | 1/2 | {0, if i is even}, {7, if i is odd} |
| 12 | | | | Reserved |
| 13 | | | | Reserved |
| 14 | | | | Reserved |
| 15 | | | | Reserved |

In one embodiment, the multiplexing pattern between SS/PBCH block and CORESET #0 as Pattern 2 can be supported for the higher frequency range, when {SS/PBCH block, PDCCH in CORESET #0} SCS are {120, 120} kHz. For this embodiment, enhancement to the Type0-PDCCH is needed.

In one approach of this embodiment, the starting symbol for the associated Type0-PDCCH can be fixed for a given SS/PBCH block.

FIG. 5 illustrate an example of Type0-PDCCH in Pattern 2 500 according to embodiments of the present disclosure. An embodiment of the Type0-PDCCH in Pattern 2 500 shown in FIG. 5 is for illustration only.

For one example, the number of symbols for CORESET #0 can be 1, when the multiplexing pattern between SS/PBCH block and CORESET #0 is Pattern 2. On illustration of this example is shown in 501 of FIG. 5, for the number of symbols for CORESET #0 as 1. The corresponding configuration can be the row with Index 0 as in TABLE 17.

For another example, the number of symbols for CORESET #0 can be 2, and the two Type0-PDCCH in a slot starts from different symbols, when the multiplexing pattern between SS/PBCH block and CORESET #0 is Pattern 2. On illustration of this example is shown in 502 of FIG. 5, for the number of symbols for CORESET #0 as 2. The corresponding configuration can be the row with Index 1 as in TABLE 17.

For yet another example, the number of symbols for CORESET #0 can be 2, and the two Type0-PDCCH in a slot starts from the same symbol, when the multiplexing pattern between SS/PBCH block and CORESET #0 is Pattern 2. On illustration of this example is shown in 503 of FIG. 5, for the number of symbols for CORESET #0 as 2. The corresponding configuration can be the row with Index 2 as in TABLE 17.

TABLE 17

Example PDCCH monitoring occasions for Type0-PDCCH CSS set - SS/PBCH block and CORESET&0 multiplexing Pattern 2 and {SS/PBCH block, PDCCH} SCS as {120, 120} kHz

| Index | PDCCH monitoring occasions (SFN and slot number) | First symbol index |
|---|---|---|
| 0 | $SFN_c = SFN_{SSB, i}$<br>$n_C = n_{SSB, i}$ | 0 if mod(i, 2) = 0<br>1 if mod(i, 2) = 1 |
| 1 | $SFN_c = SFN_{SSB, i}$<br>$n_C = n_{SSB, i}$ if mod (i, 4) = 0, 1, 3<br>$n_C = n_{SSB, i} - 1$ if mod (i, 4) = 2 | 0 if mod(i, 4) = 0<br>2 if mod(i, 4) = 1<br>12 if mod(i, 4) = 2<br>0 if mod(i, 4) = 13 |
| 2 | $SFN_c = SFN_{SSB, i}$<br>$n_C = n_{SSB, i}$ | 0 |

In another approach of this embodiment, the starting symbol for the associated Type0-PDCCH can be configurable and not associated with an SS/PBCH block index or a candidate SS/PBCH block index.

For one example, the number of symbols for CORESET #0 can be 1, when the multiplexing pattern between SS/PBCH block and CORESET #0 is Pattern 2. On illustration of this example is shown in 501 of FIG. 5, for the number of symbols for CORESET #0 as 1. The corresponding configuration can be as rows with index 0 and 1 in TABLE 18.

For another example, the number of symbols for CORESET #0 can be 2, and the two Type0-PDCCH in a slot starts from different symbols, when the multiplexing pattern between SS/PBCH block and CORESET #0 is Pattern 2. On illustration of this example is shown in 502 of FIG. 5, for the number of symbols for CORESET #0 as 2. The corresponding configuration can be the rows with Index 0, 2, and 3 as in TABLE 18.

For yet another example, the number of symbols for CORESET #0 can be 2, and the two Type0-PDCCH in a slot starts from the same symbol, when the multiplexing pattern between SS/PBCH block and CORESET #0 is Pattern 2. On illustration of this example is shown in 503 of FIG. 5, for the number of symbols for CORESET #0 as 2. The corresponding configuration can be the row with Index 0 as in TABLE 18.

TABLE 18

Example PDCCH monitoring occasions for Type0-PDCCH CSS set - SS/PBCH block and CORESET#0 multiplexing Pattern 2 and {SS/PBCH block, PDCCH} SCS as {120, 120} kHz

| Index | PDCCH monitoring occasions (SFN and slot number) | First symbol index |
|---|---|---|
| 0 | $SFN_c = SFN_{SSB, i} \, n_C = n_{SSB, i}$ | 0 |
| 1 | $SFN_c = SFN_{SSB, i} \, n_C = n_{SSB, i}$ | 1 |
| 2 | $SFN_c = SFN_{SSB, i} \, n_C = n_{SSB, i}$ | 2 |
| 3 | $SFN_c = SFN_{SSB, i} \, n_C = n_{SSB, i} - 1$ | 12 |

In one variant of the examples of this embodiment (e.g., for operation with shared spectrum channel access), the SS/PBCH block index i can be replaced by the candidate SS/PBCH block index ī, wherein $0 \leq \bar{i} \leq \bar{L}_{max} - 1$, and $\bar{L}_{max}$ is the number of candidate SS/PBCH blocks in a half frame.

In one embodiment, the multiplexing pattern between SS/PBCH block and CORESET #0 as Pattern 2 can be supported for the higher frequency range, when {SS/PBCH block, PDCCH in CORESET #0} SCS are {480, 480} kHz or {960, 960} kHz. For this embodiment, enhancement to the Type0-PDCCH is needed.

In one approach of this embodiment, the starting symbol for the associated Type0-PDCCH can be fixed for a given SS/PBCH block.

Figure 6:
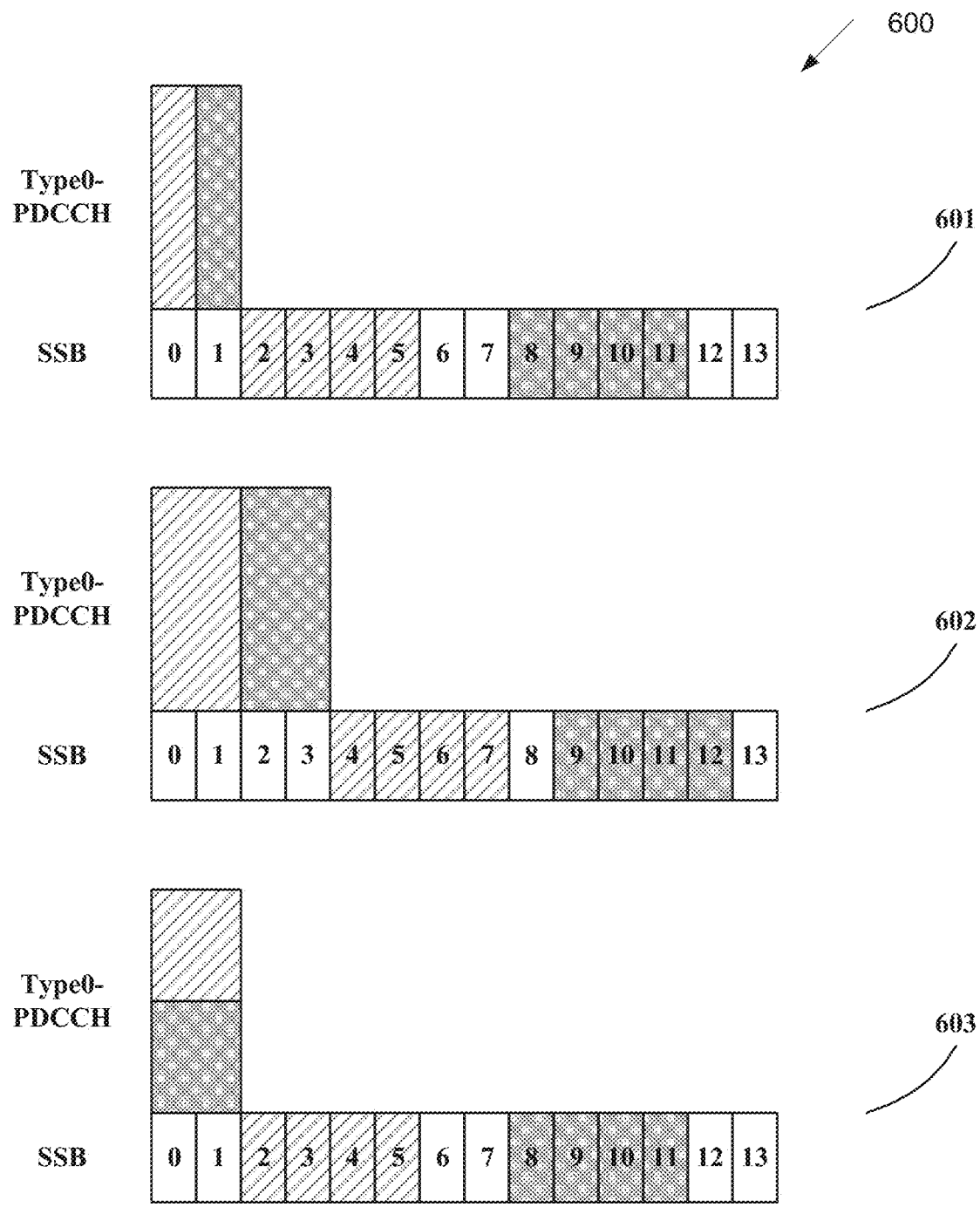
FIG. 6 illustrate an example of Type0-PDCCH in Pattern 2 according to embodiments of the present disclosure.

FIG. 6 illustrate an example of Type0-PDCCH in Pattern 2 600 according to embodiments of the present disclosure. An embodiment of the Type0-PDCCH in Pattern 2 600 shown in FIG. 6 is for illustration only.

For one example, the number of symbols for CORESET #0 can be 1, when the multiplexing pattern between SS/PBCH block and CORESET #0 is Pattern 2. On illustration of this example is shown in 601 of FIG. 6, for the number of symbols for CORESET #0 as 1. The corresponding configuration can be the row with Index 0 as in TABLE 19.

For another example, the number of symbols for CORESET #0 can be 2, and the two Type0-PDCCH in a slot starts from different symbols, when the multiplexing pattern between SS/PBCH block and CORESET #0 is Pattern 2. On illustration of this example is shown in 602 of FIG. 6, for the number of symbols for CORESET #0 as 2. The corresponding configuration can be the row with Index 1 as in TABLE 19.

For yet another example, the number of symbols for CORESET #0 can be 2, and the two Type0-PDCCH in a slot starts from the same symbol, when the multiplexing pattern between SS/PBCH block and CORESET #0 is Pattern 2. On illustration of this example is shown in 603 of FIG. 6, for the number of symbols for CORESET #0 as 2. The corresponding configuration can be the row with Index 2 as in TABLE 19.

TABLE 19

Example PDCCH monitoring occasions for Type0-PDCCH CSS set - SS/PBCH block and CORESET#0 multiplexing Pattern 2 and {SS/PBCH block, PDCCH} SCS as {480, 480} kHz or {960, 960} kHz

| Index | PDCCH monitoring occasions (SFN and slot number) | First symbol index |
|---|---|---|
| 0 | $SFN_c = SFN_{SSB, i}$<br>$n_C = n_{SSB, i}$ | 0 if mod(i, 2) = 0<br>1 if mod(i, 2) = 1 |
| 1 | $SFN_c = SFN_{SSB, i}$<br>$n_C = n_{SSB, i}$ | 0 if mod(i, 2) = 0<br>2 if mod(i, 2) = 1 |

TABLE 19-continued

Example PDCCH monitoring occasions for Type0-
PDCCH CSS set - SS/PBCH block and CORESET#0 multiplexing
Pattern 2 and {SS/PBCH block, PDCCH}
SCS as {480, 480} kHz or {960, 960} kHz

| Index | PDCCH monitoring occasions (SFN and slot number) | First symbol index |
|---|---|---|
| 2 | $SFN_c = SFN_{SSB, i}$ $n_C = n_{SSB, i}$ | 0 |

In another approach of this embodiment, the starting symbol for the associated Type0-PDCCH can be configurable and not associated with an SS/PBCH block index or a candidate SS/PBCH block index.

For one example, the number of symbols for CORESET #0 can be 1, when the multiplexing pattern between SS/PBCH block and CORESET #0 is Pattern 2. On illustration of this example is shown in 601 of FIG. 6, for the number of symbols for CORESET #0 as 1. The corresponding configuration can be as rows with index 0 and 1 in TABLE 20.

For another example, the number of symbols for CORESET #0 can be 2, and the two Type0-PDCCH in a slot starts from different symbols, when the multiplexing pattern between SS/PBCH block and CORESET #0 is Pattern 2. On illustration of this example is shown in 602 of FIG. 6, for the number of symbols for CORESET #0 as 2. The corresponding configuration can be the rows with Index 0 and 3 as in TABLE 20.

For yet another example, the number of symbols for CORESET #0 can be 2, and the two Type0-PDCCH in a slot starts from the same symbol, when the multiplexing pattern between SS/PBCH block and CORESET #0 is Pattern 2. On illustration of this example is shown in 603 of FIG. 6, for the number of symbols for CORESET #0 as 2. The corresponding configuration can be the row with Index 0 as in TABLE 20.

TABLE 20

Example PDCCH monitoring occasions for Type0-PDCCH CSS
set - SS/PBCH block and CORESET#0 multiplexing Pattern
2 and {SS/PBCH block, PDCCH} SCS as {120, 120} kHz

| Index | PDCCH monitoring occasions (SFN and slot number) | First symbol index |
|---|---|---|
| 0 | $SFN_c = SFN_{SSB, i}$ $n_C = n_{SSB, i}$ | 0 |
| 1 | $SFN_c = SFN_{SSB, i}$ $n_C = n_{SSB, i}$ | 1 |
| 2 | $SFN_c = SFN_{SSB, i}$ $n_C = n_{SSB, i}$ | 2 |

In one variant of the examples of this embodiment (e.g., for operation with shared spectrum channel access), the SS/PBCH block index i can be replaced by the candidate SS/PBCH block index ī, wherein $0 \leq \bar{i} \leq \bar{L}_{max}-1$, and $\bar{L}_{max}$ is the number of candidate SS/PBCH blocks in a half frame.

In one embodiment, when the multiplexing pattern between SS/PBCH block and CORESET #0 as Pattern 3 is supported for the higher frequency range, wherein the {SS/PBCH block, PDCCH in CORESET #0} SCS are {120, 120} kHz, the starting symbol for the associated Type0-PDCCH can be configurable and not associated with an SS/PBCH block index or a candidate SS/PBCH block index.

For example, the configurations can be as in TABLE 21.

TABLE 21

Example PDCCH monitoring occasions for Type0-PDCCH CSS
set - SS/PBCH block and CORESET#0 multiplexing Pattern
3 and {SS/PBCH block, PDCCH} SCS as {120, 120} kHz

| Index | PDCCH monitoring occasions (SFN and slot number) | First symbol index |
|---|---|---|
| 0 | $SFN_c = SFN_{SSB, i}$, $n_C = n_{SSB, i}$ | 2 |
| 1 | $SFN_c = SFN_{SSB, i}$, $n_C = n_{SSB, i}$ | 4 |
| 2 | $SFN_c = SFN_{SSB, i}$, $n_C = n_{SSB, i}$ | 6 |
| 3 | $SFN_c = SFN_{SSB, i}$, $n_C = n_{SSB, i}$ | 8 |

In one variant of the examples of this embodiment (e.g., for operation with shared spectrum channel access), the SS/PBCH block index i can be replaced by the candidate SS/PBCH block index ī, wherein $0 \leq \bar{i} \leq \bar{L}_{max}-1$, and $\bar{L}_{max}$ is the number of candidate SS/PBCH blocks in a half frame.

In one embodiment, the multiplexing pattern between SS/PBCH block and CORESET #0 as Pattern 3 can be supported for the higher frequency range, when the {SS/PBCH block, PDCCH in CORESET #0} SCS are {480, 480} kHz or {960, 960} kHz.

In one approach of this embodiment, the starting symbol for the associated Type0-PDCCH can be fixed for a given SS/PBCH block. For instance, the starting symbol for the associated Type0-PDCCH can be aligned with the starting symbol of the SS/PBCH block.

For one example, if the starting symbols of the two candidate SS/PBCH blocks in a slot are $N_1$ and $N_2$, respectively, then the configuration of Type0-PDCCH can be as in TABLE 22. For one instance, $N_1=2$ and $N_2=8$. For another instance, $N_1=2$ and $N_2=9$.

TABLE 22

Example PDCCH monitoring occasions for Type0-
PDCCH CSS set - SS/PBCH block and CORESET#0 multiplexing
Pattern 3 and {SS/PBCH block, PDCCH}
SCS as {480, 480} kHz or {960, 960} kHz

| Index | PDCCH monitoring occasions (SFN and slot number) | First symbol index |
|---|---|---|
| 0 | $SFN_c = SFN_{SSB, i}$, $n_C = n_{SSB, i}$ | $N_1$ if mod(i, 2) = 0 $N_2$ if mod(i, 2) = 1 |

For another example, if the starting symbols of the four candidate SS/PBCH blocks in two consecutive slots are $N_1$, $N_2$, $N_3$, and $N_4$ respectively, then the configuration of Type0-PDCCH can be as in TABLE 23. For one instance, $N_1=3$, $N_2=8$, $N_3=2$, and $N_4=7$. For another instance, $N_1=4$, $N_2=8$, $N_3=2$, and $N_4=6$.

TABLE 23

Example PDCCH monitoring occasions for Type0-
PDCCH CSS set - SS/PBCH block and CORESET#0 multiplexing
Pattern 3 and {SS/PBCH block, PDCCH}
SCS as {480, 480} kHz or {960, 960} kHz

| Index | PDCCH monitoring occasions (SFN and slot number) | First symbol index |
|---|---|---|
| 0 | $SFN_c = SFN_{SSB, i}$, $n_C = n_{SSB, i}$ | $N_1$ if mod(i, 4) = 0 $N_2$ if mod(i, 4) = 1 $N_3$ if mod(i, 4) = 2 $N_4$ if mod(i, 4) = 3 |

In another approach of this embodiment, the starting symbol for the associated Type0-PDCCH can be configurable and not associated with an SS/PBCH block index or a candidate SS/PBCH block index.

For one example, if the starting symbols of the two candidate SS/PBCH blocks in a slot are $N_1$ and $N_2$, respectively, then the configuration of Type0-PDCCH can be as in TABLE 24. For one instance, $N_1=2$ and $N_2=8$. For another instance, $N_1=2$ and $N_2=9$.

TABLE 24

Example PDCCH monitoring occasions for Type0-PDCCH CSS set - SS/PBCH block and CORESET#0 multiplexing Pattern 3 and {SS/PBCH block, PDCCH} SCS as {480, 480} kHz or {960, 960} kHz

| Index | PDCCH monitoring occasions (SFN and slot number) | First symbol index |
|---|---|---|
| 0 | $SFN_c = SFN_{SSB, i}$, $n_C = n_{SSB, i}$ | $N_1$ |
| 1 | $SFN_c = SFN_{SSB, i}$, $n_C = n_{SSB, i}$ | $N_2$ |

For another example, if the starting symbols of the four candidate SS/PBCH blocks in two consecutive slots are $N_1$, $N_2$, $N_3$, and $N_4$ respectively, then the configuration of Type0-PDCCH can be as in TABLE 25. For one instance, $N_1=3$, $N_2=8$, $N_3=2$, and $N_4=7$. For another instance, $N_1=4$, $N_2=8$, $N_3=2$, and $N_4=6$.

TABLE 25

Example PDCCH monitoring occasions for Type0-PDCCH CSS set - SS/PBCH block and CORESET#0 multiplexing Pattern 3 and {SS/PBCH block, PDCCH} SCS as {480, 480} kHz or {960, 960} kHz

| Index | PDCCH monitoring occasions (SFN and slot number) | First symbol index |
|---|---|---|
| 0 | $SFN_c = SFN_{SSB, i}$, $n_C = n_{SSB, i}$ | $N_1$ |
| 1 | $SFN_c = SFN_{SSB, i}$, $n_C = n_{SSB, i}$ | $N_2$ |
| 2 | $SFN_c = SFN_{SSB, i}$, $n_C = n_{SSB, i}$ | $N_3$ |
| 3 | $SFN_c = SFN_{SSB, i}$, $n_C = n_{SSB, i}$ | $N_4$ |

In one variant of the examples of this embodiment (e.g., for operation with shared spectrum channel access), the SS/PBCH block index i can be replaced by the candidate SS/PBCH block index ī, wherein $0 \leq \bar{i} \leq \bar{L}_{max}-1$, and $\bar{L}_{max}$ is the number of candidate SS/PBCH blocks in a half frame.

In one embodiment, there can be a multi-slot based PDCCH monitoring capability supported for a UE in monitoring common search space sets. The multi-slot based PDCCH monitoring capability can be defined as (X, Y), wherein X is the minimum separation between the starting symbol of two consecutive multi-slot group, and Y is the maximum duration of monitoring within the multi-slot group (e.g., for at least some of the search space sets).

In one example, for the higher frequency range, when using a new SCS as 480 kHz or 960 kHz, X can be no less than one slot (e.g., X=4 for 480 kHz SCS and/or X=8 for 960 kHz SCS), and Y can be no larger than one slot (e.g., Y=1). For one instance, the (X, Y) multi-slot based PDCCH monitoring capability (e.g., (X, Y)=(4, 1) for 480 kHz SCS and/or (X, Y)=(8, 1) for 960 kHz SCS) can be a default one before any value of (X, Y) is reported (e.g., before RRC connection). For another instance, the (X, Y) multi-slot based PDCCH monitoring capability can be a reported capability with Y no larger than one slot after RRC connection.

In one approach, for the SS/PBCH block and CORESET multiplexing pattern 1, a UE monitors PDCCH in the Type0-PDCCH CSS set over the single slot with index $n_0$.

In one example of this approach, this monitoring behavior is supported at least for IDLE/INACTIVE mode.

In another example of this approach, this monitoring behavior is supported at least for a CONNECTED mode, and the reported UE capability indicates Y is at most 1 slot.

For one further aspect of this approach, in the Type0-PDCCH configuration (e.g., provided in MIB), M cannot be configured as 2 for the SS/PBCH block and CORESET multiplexing pattern 1.

In another approach, the SS/PBCH block and CORESET multiplexing pattern 1, a UE monitors PDCCH in the Type0-PDCCH CSS set over the single slot, and the slot index of the single slot is $n_0$ if M is 1 or ½, and can be configured as either $n_0$ or $n_0+1$ if M is 2.

One example Type0-PDCCH configuration for M=2 in SS/PBCH block and CORESET multiplexing pattern 1 is shown in TABLE 26 (all the examples or a subset of the examples can be supported).

TABLE 26

Example PDCCH monitoring occasions for Type0-PDCCH CSS set - SS/PBCH block and CORESET#0 multiplexing Pattern 1

| Index | O | Number of search space sets per slot | M | First symbol index | Slot index |
|---|---|---|---|---|---|
| — | 0 | 1 | 2 | 0 | $n_0$ |
| — | 0 | 1 | 2 | 0 | $n_0 + 1$ |
| — | 5 | 1 | 2 | 0 | $n_0$ |
| — | 5 | 1 | 2 | 0 | $n_0 + 1$ |

In one embodiment, a UE can report multiple capabilities on the supported value of X, in the multi-slot based PDCCH monitoring capability, wherein X is slot group for defining the total BD/CCE budget. For example, X can take value from 2 or 4 for 480 kHz SCS. For another example, X can take value from 4 or 8 for 960 kHz SCS.

When at least one value of X is reported, the UE determines a value $\bar{X}$ based on the reported value(s) of X, and monitors slot $n_0$ and $n_0+\bar{X}$ for Type0-PDCCH.

In one example, $\bar{X}$ is the maximum of all reported values of X. For instance, if a UE reports supported values of X as {2, 4} as its capabilities for 480 kHz, the UE monitors slots $n_0$ and $n_0+4$ for Type0-PDCCH. For another instance, if a UE reports supported values of X as {4, 8} as its capabilities for 480 kHz, the UE monitors slots $n_0$ and $n_0+8$ for Type0-PDCCH.

In another example, $\bar{X}$ is the minimum of all reported values of X. For instance, if a UE reports supported values of X as {2, 4} as its capabilities for 480 kHz, the UE monitors slots $n_0$ and $n_0+2$ for Type0-PDCCH. For another instance, if a UE reports supported values of X as {4, 8} as its capabilities for 480 kHz, the UE monitors slots $n_0$ and $n_0+4$ for Type0-PDCCH.

In yet another example, $\bar{X}$ is the least common multiple of all reported values of X. For instance, if a UE reports supported values of X as {2, 4} as its capabilities for 480 kHz, the UE monitors slots $n_0$ and $n_0+4$ for Type0-PDCCH. For another instance, if a UE reports supported values of X as {4, 8} as its capabilities for 480 kHz, the UE monitors slots $n_0$ and $n_0+8$ for Type0-PDCCH.

In yet another example, $\bar{X}$ is greatest common divisor of all reported values of X. For instance, if a UE reports supported values of X as {2, 4} as its capabilities for 480 kHz, the UE monitors slots $n_0$ and $n_0+2$ for Type0-PDCCH. For another instance, if a UE reports supported values of X as {4, 8} as its capabilities for 480 kHz, the UE monitors slots $n_0$ and $n_0+4$ for Type0-PDCCH.

When no value of X is reported (e.g., before UE capability signaling), the UE utilizes a default value of X to perform Type0-PDCCH monitoring. For example, for 480 kHz SCS, the UE monitors slots $n_0$ and $n_0+4$ for Type0-PDCCH (e.g., the default value of X is 4 for 480 kHz SCS). For another example, for 960 kHz SCS, the UE monitors slots $n_0$ and $n_0+8$ for Type0-PDCCH (e.g., the default value of X is 8 for 960 kHz SCS).

In one example (e.g., combining some examples with and without X reported), for 480 kHz SCS, the UE monitors slots $n_0$ and $n_0+4$ for Type0-PDCCH, e.g., regardless of X is reported or not, and regardless of the number of values for X reported.

In another example (e.g., combining some examples with and without X reported), for 960 kHz SCS, the UE monitors slots $n_0$ and $n_0+8$ for Type0-PDCCH, e.g., regardless of X is reported or not, and regardless of the number of values for X reported.

In one embodiment, there can be an enhancement to the default time domain resource allocation. For example, the enhancement can be applicable to the subcarrier spacing of 480 kHz and/or 960 kHz. For another example, the enhancement can be applicable to the case of SS/PBCH block pattern in time domain as the starting symbols of the candidate SS/PBCH blocks within a slot as 2 and 9.

In one example, for SS/PBCH block and CORESET #0 multiplexing pattern 1 (e.g., using default PDSCH time domain resource allocation A for normal CP), at least one of the following row in TABLE 27 can be supported. In one further consideration for this example, when the at least one row in TABLE 27 is supported, the same number of rows in Rel-15 configuration table are reinterpreted to support the at least one row in TABLE 27. For instance, row "9" and/or "11" from Rel-15 configuration table can be reinterpreted to support the at least one row in TABLE 27.

TABLE 27

Example enhancement to default PDSCH time domain resource allocation A for normal CP.

| Row index | dmrs-TypeA-Position | PDSCH mapping type | K_0 | S | L |
|---|---|---|---|---|---|
| 1 | 2 and/or 3 | B | 0 | 9 | 4 |
| 2 | 2 and/or 3 | B | 0 | 7 | 4 |
| 3 | 2 and/or 3 | B | 0 | 7 | 2 |
| 4 | 2 and/or 3 | B | 0 | 8 | 2 |
| 5 | 2 and/or 3 | B | 0 | 10 | 2 |
| 6 | 2 and/or 3 | B | 0 | 11 | 2 |
| 7 | 2 and/or 3 | B | 0 | 6 | 7 |
| 8 | 2 and/or 3 | B | 0 | 7 | 7 |

In another example, for SS/PBCH block and CORESET #0 multiplexing pattern 2 (e.g., using default PDSCH time domain resource allocation B), at least one of the following row in TABLE 28 can be supported. In one further consideration for this example, when the at least one row in TABLE 28 is supported, a number of rows in Rel-15 configuration table are reinterpreted to support the at least one row in TABLE 28, and/or the reserved rows in Rel-15 configuration table are utilized to support the at least one row in TABLE 28. For instance, row "4" and/or "11" from Rel-15 configuration table can be reinterpreted to support the at least one row in TABLE 28. For another instance, reserved row "16" from Rel-15 configuration table can be utilized to support the at least one row in TABLE 28.

TABLE 28

Example enhancement to default PDSCH time domain resource allocation B.

| Row index | dmrs-TypeA-Position | PDSCH mapping type | K_0 | S | L |
|---|---|---|---|---|---|
| 1 | 2 and/or 3 | B | 0 | 7 | 2 |
| 2 | 2 and/or 3 | B | 0 | 9 | 2 |
| 3 | 2 and/or 3 | B | 0 | 11 | 2 |
| 4 | 2 and/or 3 | B | 0 | 7 | 4 |
| 5 | 2 and/or 3 | B | 0 | 9 | 4 |
| 6 | 2 and/or 3 | B | 0 | 6 | 7 |
| 7 | 2 and/or 3 | B | 0 | 7 | 7 |

In yet another example, for SS/PBCH block and CORESET #0 multiplexing pattern 3 (e.g., using default PDSCH time domain resource allocation C), at least one of the following row in TABLE 29 can be supported. In one further consideration for this example, when the at least one row in TABLE 29 is supported, a number of rows in Rel-15 configuration table are reinterpreted to support the at least one row in TABLE 29, and/or the reserved rows in Rel-15 configuration table are utilized to support the at least one row in TABLE 29. For instance, row "4" and/or "11" from Rel-15 configuration table can be reinterpreted to support the at least one row in TABLE 29. For another instance, reserved row "6" and/or "7" from Rel-15 configuration table can be utilized to support the at least one row in TABLE 29.

TABLE 29

Example enhancement to default PDSCH time domain resource allocation C.

| Row index | dmrs-TypeA-Position | PDSCH mapping type | K_0 | S | L |
|---|---|---|---|---|---|
| 1 | 2 and/or 3 | B | 0 | 7 | 2 |
| 2 | 2 and/or 3 | B | 0 | 9 | 2 |
| 3 | 2 and/or 3 | B | 0 | 11 | 2 |
| 4 | 2 and/or 3 | B | 0 | 7 | 4 |
| 5 | 2 and/or 3 | B | 0 | 9 | 4 |
| 6 | 2 and/or 3 | B | 0 | 6 | 7 |
| 7 | 2 and/or 3 | B | 0 | 7 | 7 |

In one embodiment, for an operation with shared spectrum channel access and for the SS/PBCH block and CORESET multiplexing pattern to be at least one of Pattern 2 or Pattern 3, a UE monitors PDCCH in the Type0-PDCCH CSS set over slots that include Type0-PDCCH monitoring occasions associated with SS/PBCH blocks that are quasi co-located with the SS/PBCH block that provides a CORESET for Type0-PDCCH CSS set with respect to average gain, quasi co-location "typeA" and "typeD" properties.

In one example, for a candidate SS/PBCH block index $\bar{i}$, wherein $0 \leq \bar{i} \leq \bar{L}_{max}-1$ (where $\bar{L}_{max}$ is the number of candidate SS/PBCH blocks within a half frame), the slot including the associated Type0-PDCCH monitoring occasion is the same as the slot including candidate SS/PBCH block with index $\bar{i}$. In one further consideration, the periodicity of the slot including the associated Type0-PDCCH monitoring occasion is the same as the periodicity of the candidate SS/PBCH block with index $\bar{i}$.

In another example, for a candidate SS/PBCH block index $\bar{i}$, wherein $0 \leq \bar{i} \leq \bar{L}_{max}-1$ (where $\bar{L}_{max}$ is the number of candidate SS/PBCH blocks within a half frame), the slot including the associated Type0-PDCCH monitoring occasion is determined by the UE based on the parameters provided by example tables of this disclosure. In one further consideration, the periodicity of the slot including the associated Type0-PDCCH monitoring occasion is the same as the periodicity of the candidate SS/PBCH block with index $\bar{i}$.

In one example, for a SS/PBCH block index i, wherein $0 \leq i \leq L_{max}-1$, the slot including the associated Type0-PDCCH monitoring occasion is the same as the slot including candidate SS/PBCH block with index $\bar{i}$. In one further consideration, the periodicity of the slot including the associated Type0-PDCCH monitoring occasion is the same as the periodicity of the candidate SS/PBCH block with index $\bar{i}$.

In another example, for a SS/PBCH block index i, wherein $0 \leq i \leq L_{max}-1$, the slot including the associated Type0-PDCCH monitoring occasion is determined by the UE based on the parameters provided by example tables of this disclosure. In one further consideration, the periodicity of the slot including the associated Type0-PDCCH monitoring occasion is the same as the periodicity of the candidate SS/PBCH block with index $\bar{i}$.

In one example, the slots including the associated Type0-PDCCH monitoring occasions corresponding to the same candidate SS/PBCH block are with a periodicity same as the periodicity of the candidate SS/PBCH block.

In one example, this embodiment is only applicable to higher frequency range (FR2-2).

In one example, this embodiment is only applicable for 120 kHz SCS.

In another example, this embodiment is applicable for 120 kHz, 480 kHz, and 960 kHz SCS.

In one example, for an operation with shared spectrum channel access in FR2-2, the SS/PBCH block index i is same as the candidate SS/PBCH block index $\bar{i}$.

In another example, for an operation with shared spectrum channel access in FR2-2 with 120 kHz SCS, the SS/PBCH block index i is same as the candidate SS/PBCH block index $\bar{i}$.

The present disclosure focuses on the enhancement of SS/PBCH block indication for transmission and measurement. The present disclosure includes the following aspects: (1) SS/PBCH block indication framework; (2) example of SS/PBCH block indication framework; and (3) example UE procedure for determining the SS/PBCH block indication.

In NR Rel-15, a subcarrier spacing (SCS) of a SS/PBCH block can be one of 15 kHz or 30 kHz for FR1, and one of 120 kHz or 240 kHz for FR2. The transmission of SS/PBCH block in a serving cell can be indicated to a UE by a RRC parameter (e.g., ssb-PositionsInBurst), in a broadcast system information or a dedicated UE-specific signal, wherein the indication is provided by a bitmap and each bit in the bitmap corresponds to a SS/PBCH block in the serving cell.

Meanwhile, the measurement of SS/PBCH block can be indicated to a UE by another RRC parameter (e.g., ssb-ToMeasure), in a broadcast system information or a dedicated UE-specific signal, wherein the indication is also provided by a bitmap and each bit in the bitmap corresponds to a SS/PBCH block to be measured.

In NR Rel-16, for an operation with shared spectrum channel access, a transmission window for SS/PBCH block was supported, wherein one SS/PBCH block can be associated with multiple transmission opportunities within the window to resist the impact from uncertain channel access, and the interval between two neighboring transmission opportunities is configurable by the gNB, in MIB or RRC parameter. Similar mechanism is also applicable to the measurement window, and one SS/PBCH block can correspond to multiple candidate locations to be measured.

For a higher carrier frequency range (e.g., 52.6 to 71 GHz), there could be new SCS supported for SS/PBCH block, and there could be new design requirement of non-consecutive slots mapped for SS/PBCH blocks. These aspects lead to issues with current indication mechanism of SS/PBCH block for transmission and for measurement, and enhancement to NR Rel-15 and Rel-16 indication mechanism may be supported.

In one embodiment, an SS/PBCH block indication framework includes at least one of the following components: (1) a number ($N_1$) of candidate SS/PBCH block locations in a predefined time duration (e.g., a half frame); (2) a configured bitmap with length ($N_2$), wherein each bit in the bitmap corresponds to at least one candidate SS/PBCH block locations; (3) a maximum number ($N_3$) of SS/PBCH block index per cell (e.g., which is same as a maximum number of SS/PBCH block transmitted/measured per cell or maximum number of SS/PBCH block beams per cell); or (4) a configured QCL parameter ($N_4$) for candidate SS/PBCH block locations, such that two candidate SS/PBCH block locations with an interval of the QCL parameter are assumed to be QCLed.

In one instance for $N_1$, $N_1$ is fixed for a given SCS of SS/PBCH block. For one example, $N_1$ is 64 for the SCS of SS/PBCH block as 120 kHz and/or 240 kHz and/or 480 kHz and/or 960 kHz. For another example, $N_1$ is 80 for the SCS of SS/PBCH block as 120 kHz. For yet another example, $N_1$ is 128 for the SCS of SS/PBCH block as 240 kHz and/or 480 kHz and/or 960 kHz. For yet another example, $N_1$ is 160 for the SCS of SS/PBCH block as 240 kHz. For yet another example, $N_1$ is 320 for the SCS of SS/PBCH block as 480 kHz. For yet another example, $N_1$ is 640 for the SCS of SS/PBCH block as 960 kHz.

In another instance for $N_1$, $N_1 \geq N_2$. For one example, $N_1=N_2$, then the k-th bit in the bitmap corresponds to a single SS/PBCH block with candidate SS/PBCH block index as k−1, wherein the candidate SS/PBCH block index starts with 0. For another example, $N_1=N_2$ is applicable to an operation without shared spectrum channel access. For yet another example, $N_1=N_2$ is applicable to an operation with shared spectrum channel access, and the transmission of SS/PBCH block is not subject to a channel sensing procedure (e.g., in a no-LBT operation mode, and/or transmission window for SS/PBCH block is not enabled).

In one instance for $N_2$, $N_2 > 64$. For one example, it can be supported for high carrier frequency (e.g., higher than 52.6 GHz). For another example, it can be supported for shared spectrum channel access and/or a cell operates with a channel sensing mode.

In another instance for $N_2$, $N_2$ can be indicated by the gNB. For example, there can be an indication of $N_2$ in the system information. For another example, there can be an indication of $N_2$ in a UE-specific RRC parameter.

In one instance for $N_3$, $N_3 \leq N_2$. For one example, $N_3 < N_2$, and a UE assumes at most $N_3$ bits in the bitmap with length $N_2$ can take a value of 1, e.g., if the UE is not provided with a value of $N_4$ or the value of $N_4$ is not supported. In one further aspect, the at most $N_3$ bits may not have to be the first at most $N_3$ bits in the bitmap.

In one instance for $N_4$, $N_4$ can be indicated by the gNB. For example, there can be an indication of $N_4$ in the system information. For another example, there can be an indication of $N_4$ in a UE-specific RRC parameter.

In another instance for $N_4$, $N_4 \leq N_2$. For example, if $N_4$ is configured, a UE assumes only the first $N_4$ bits in the bitmap with length $N_2$ could take a value of 1, and the last $N_2-N_4$ number of bits are 0s. For another example, if $N_4$ is configured, the k-th bit ($1 \leq k \leq N_4$) in the bitmap corresponds to a candidate SS/PBCH block location with candidate SS/PBCH block index as $m \cdot N_4+k-1$, wherein m is a non-negative integer with $m \cdot N_4+k-1 \leq N_1-1$.

In yet another instance for $N_4$, $N_4$ is only supported for an operation with shared spectrum channel access. For example, $N_4$ is only applicable when the transmission of SS/PBCH block is subject to a channel sensing procedure (e.g., an LBT operation mode).

In one instance, the framework for SS/PBCH block indication can be applicable to the indication of the transmission of SS/PBCH block. For example, if $N_4$ is configured, the k-th bit ($1 \leq k \leq N_4$) in the bitmap corresponds to a candidate SS/PBCH block location with candidate SS/PBCH block index as $m \cdot N_4+k-1$, wherein m is a non-negative integer with $m \cdot N_4+k-1 \leq N_1-1$, and if the k-th bit takes a value of 1, the UE assumes at least one of the SS/PBCH blocks with candidate SS/PBCH block index $m \cdot N_4+k-1$ can be transmitted by the gNB; and if the k-th bit takes a value of 0, the UE assumes all the SS/PBCH blocks with candidate SS/PBCH block index $m \cdot N_4+k-1$ are not transmitted by the gNB.

In another instance, the framework for SS/PBCH block indication can be applicable to the indication of SS/PBCH blocks to be measured. For example, if $N_4$ is configured, the k-th bit ($1 \leq k \leq N_4$) in the bitmap corresponds to a candidate SS/PBCH block location with candidate SS/PBCH block index as $m \cdot N_4+k-1$, wherein m is a non-negative integer with $m \cdot N_4+k-1 \leq N_1-1$, and if the k-th bit takes a value of 1, the UE assumes at least one of the SS/PBCH blocks with candidate SS/PBCH block index $m \cdot N_4+k-1$ could be measured; and if the k-th bit takes a value of 0, the UE assumes all the SS/PBCH blocks with candidate SS/PBCH block index $m \cdot N_4+k-1$ are not to be measured.

In one example, for the SCS of SS/PBCH block as 120 kHz, there can be $N_1=80$ candidate SS/PBCH block locations within a half frame. A UE can be configured with a first bitmap and/or a second bitmap, wherein both bitmap are with length $N_2=80$. If $N_4$ is not provided to the UE, or $N_4$ is not applicable (e.g., the QCL assumption within a half frame is not supported), the UE assumes each bit in the bitmap corresponds to a candidate SS/PBCH block location within the half frame: the k-th bit in the bitmap corresponds to a candidate SS/PBCH block location with candidate SS/PBCH block index as k-1.

The UE assumes at most $N_3=64$ bits in the first and/or second bitmap can take a value of 1. The UE can be further configured with a value of $N_4$ associated with either of the bitmaps, such that SS/PBCK blocks with the candidate SS/PBCH block index $\bar{i}$ are QCLed, if mod($\bar{i}$, $N_4$) is the same for those SS/PBCH blocks. If $N_4$ is provided to the UE, the UE assumes only the first $N_4$ bits in the first and/or second bitmap with length $N_2$ could take a value of 1, and the last $N_2-N_4$ number of bits are 0s.

The UE can further assume the k-th bit ($1 \leq k \leq N_4$) in the first and/or second bitmap corresponds to a candidate SS/PBCH block location with candidate SS/PBCH block index as $m \cdot N_4+k-1$, wherein m is a non-negative integer with $m \cdot N_4+k-1 \leq N_1-1$. If the k-th bit in the first bitmap takes a value of 1, the UE assumes at least one of the SS/PBCH blocks with candidate SS/PBCH block index $m \cdot N_4+k-1$ can be transmitted by the gNB; and if the k-th bit in the first bitmap takes a value of 0, the UE assumes all the SS/PBCH blocks with candidate SS/PBCH block index $m \cdot N_4+k-1$ are not transmitted by the gNB. If the k-th bit in the second bitmap takes a value of 1, the UE assumes at least one of the SS/PBCH blocks with candidate SS/PBCH block index $m \cdot N_4+k-1$ could be measured; and if the k-th bit in the second bitmap takes a value of 0, the UE assumes all the SS/PBCH blocks with candidate SS/PBCH block index $m \cdot N_4+k-1$ are not to be measured. In one sub-example, $N_4$ can be indicated in MIB or SIB1.

In another sub-example, $N_4$ can be indicated in higher layer parameter. In one example of the configurable value of $N_4$, $N_4$ can be from the set or a subset of {1, 2, 4, 8, 16, 32, 64}. In another example of the configurable value of $N_4$, $N_4$ can be from the set or a subset of {1, 2, 4, 8, 16, 32, 64, 80}.

In another example, for the SCS of SS/PBCH block as 240 kHz or 480 kHz or 960 kHz, there can be $N_1=128$ candidate SS/PBCH block locations within a half frame. A UE can be configured with a first bitmap and/or a second bitmap, wherein both bitmap are with length $N_2=80$. The UE assumes at most $N_3=64$ bits in the first and/or second bitmap can take a value of 1. The UE can be further configured with a value of $N_4$ associated with either of the bitmaps, such that SS/PBCK blocks with the candidate SS/PBCH block index $\bar{i}$ are QCLed, if mod($\bar{i}$, $N_4$) is the same for those SS/PBCH blocks. If $N_4$ is provided to the UE, the UE assumes only the first $N_4$ bits in the first and/or second bitmap with length $N_2$ could take a value of 1, and the last $N_2-N_4$ number of bits are 0s.

The UE can further assume the k-th bit ($1 \leq k \leq N_4$) in the first and/or second bitmap corresponds to a candidate SS/PBCH block location with candidate SS/PBCH block index as $m \cdot N_4+k-1$, wherein m is a non-negative integer with $m \cdot N_4+k-1 \leq N_1-1$. If the k-th bit in the first bitmap takes a value of 1, the UE assumes at least one of the SS/PBCH blocks with candidate SS/PBCH block index $m \cdot N_4+k-1$ can be transmitted by the gNB; and if the k-th bit in the first bitmap takes a value of 0, the UE assumes all the SS/PBCH blocks with candidate SS/PBCH block index $m \cdot N_4+k-1$ are not transmitted by the gNB. If the k-th bit in the second bitmap takes a value of 1, the UE assumes at least one of the SS/PBCH blocks with candidate SS/PBCH block index $m \cdot N_4+k-1$ could be measured; and if the k-th bit in the second bitmap takes a value of 0, the UE assumes all the SS/PBCH blocks with candidate SS/PBCH block index $m \cdot N_4+k-1$ are not to be measured. In one sub-example, $N_4$ can be indicated in MIB or SIB1.

In another sub-example, $N_4$ can be indicated in higher layer parameter. In one example of the configurable value of $N_4$, $N_4$ can be from the set or a subset of {1, 2, 4, 8, 16, 32, 64}. In another example of the configurable value of $N_4$, $N_4$ can be from the set or a subset of {1, 2, 4, 8, 16, 32, 64, 80}.

In yet another example, for the SCS of SS/PBCH block as 240 kHz or 480 kHz or 960 kHz, there can be $N_1=128$ candidate SS/PBCH block locations within a half frame. A UE can be configured with a first bitmap and/or a second bitmap, wherein both bitmap are with length $N_2=128$. If $N_4$ is not provided to the UE, or $N_4$ is not applicable (e.g., the QCL assumption within a half frame is not supported), the UE assumes each bit in the bitmap corresponds to a candidate SS/PBCH block location within the half frame: the k-th bit in the bitmap corresponds to a candidate SS/PBCH block location with candidate SS/PBCH block index as k-1.

The UE assumes at most $N_3=64$ bits in the first and/or second bitmap can take a value of 1. The UE can be further configured with a value of $N_4$ associated with either of the bitmaps, such that SS/PBCK blocks with the candidate SS/PBCH block index $\bar{i}$ are QCLed, if mod($\bar{i}$, $N_4$) is the same for those SS/PBCH blocks. If $N_4$ is provided to the UE, the UE assumes only the first $N_4$ bits in the first and/or second bitmap with length $N_2$ could take a value of 1, and the last $N_2-N_4$ number of bits are 0s.

The UE can further assume the k-th bit ($1 \leq k \leq N_4$) in the first and/or second bitmap corresponds to a candidate SS/PBCH block location with candidate SS/PBCH block index as $m \cdot N_4+k-1$, wherein m is a non-negative integer with $m \cdot N_4+k-1 \leq N_1-1$. If the k-th bit in the first bitmap takes a value of 1, the UE assumes at least one of the SS/PBCH blocks with candidate SS/PBCH block index $m \cdot N_4+k-1$ can be transmitted by the gNB; and if the k-th bit in the first bitmap takes a value of 0, the UE assumes all the SS/PBCH blocks with candidate SS/PBCH block index $m \cdot N_4+k-1$ are not transmitted by the gNB. If the k-th bit in the second bitmap takes a value of 1, the UE assumes at least one of the SS/PBCH blocks with candidate SS/PBCH block index $m \cdot N_4+k-1$ could be measured; and if the k-th bit in the second bitmap takes a value of 0, the UE assumes all the SS/PBCH blocks with candidate SS/PBCH block index $m \cdot N_4+k-1$ are not to be measured. In one sub-example, $N_4$ can be indicated in MIB or SIB1.

In another sub-example, $N_4$ can be indicated in higher layer parameter. In one example of the configurable value of $N_4$, $N_4$ can be from the set or a subset of $\{1, 2, 4, 8, 16, 32, 64\}$. In another example of the configurable value of $N_4$, $N_4$ can be from the set or a subset of $\{1, 2, 4, 8, 16, 32, 64, 128\}$.

In yet another example, for the SCS of SS/PBCH block as 240 kHz or 480 kHz or 960 kHz, there can be $N_1$=128 or 256 or 512 candidate SS/PBCH block locations within a half frame, correspondingly. A UE can be configured with a first bitmap and/or a second bitmap, wherein both bitmap are with length $N_2$=128. The UE assumes at most $N_3$=64 bits in the first and/or second bitmap can take a value of 1. The UE can be further configured with a value of $N_4$ associated with either of the bitmaps, such that SS/PBCK blocks with the candidate SS/PBCH block index ī are QCLed, if mod(ī, $N_4$) is the same for those SS/PBCH blocks. If $N_4$ is provided to the UE, the UE assumes only the first $N_4$ bits in the first and/or second bitmap with length $N_2$ could take a value of 1, and the last $N_2-N_4$ number of bits are 0s.

The UE can further assume the k-th bit ($1 \leq k \leq N_4$) in the first and/or second bitmap corresponds to a candidate SS/PBCH block location with candidate SS/PBCH block index as $m \cdot N_4+k-1$, wherein m is a non-negative integer with $m \cdot N_4+k-1 \leq N_1-1$. If the k-th bit in the first bitmap takes a value of 1, the UE assumes at least one of the SS/PBCH blocks with candidate SS/PBCH block index $m \cdot N_4+k-1$ can be transmitted by the gNB; and if the k-th bit in the first bitmap takes a value of 0, the UE assumes all the SS/PBCH blocks with candidate SS/PBCH block index $m \cdot N_4+k-1$ are not transmitted by the gNB. If the k-th bit in the second bitmap takes a value of 1, the UE assumes at least one of the SS/PBCH blocks with candidate SS/PBCH block index $m \cdot N_4+k-1$ could be measured; and if the k-th bit in the second bitmap takes a value of 0, the UE assumes all the SS/PBCH blocks with candidate SS/PBCH block index $m \cdot N_4+k-1$ are not to be measured.

In one sub-example, $N_4$ can be indicated in MIB or SIB1. In another sub-example, $N_4$ can be indicated in higher layer parameter. In one example of the configurable value of $N_4$, $N_4$ can be from the set or a subset of $\{1, 2, 4, 8, 16, 32, 64\}$. In another example of the configurable value of $N_4$, $N_4$ can be from the set or a subset of $\{1, 2, 4, 8, 16, 32, 64, 128\}$.

In yet another example, for the SCS of SS/PBCH block as 240 kHz or 480 kHz or 960 kHz, there can be $N_1$=160 or 320 or 640 candidate SS/PBCH block locations within a half frame, correspondingly. A UE can be configured with a first bitmap and/or a second bitmap, wherein both bitmap are with length $N_2$=80. The UE assumes at most $N_3$=64 bits in the first and/or second bitmap can take a value of 1.

The UE can be further configured with a value of $N_4$ associated with either of the bitmaps, such that SS/PBCK blocks with the candidate SS/PBCH block index ī are QCLed, if mod(ī, $N_4$) is the same for those SS/PBCH blocks. If $N_4$ is provided to the UE, the UE assumes only the first $N_4$ bits in the first and/or second bitmap with length $N_2$ could take a value of 1, and the last $N_2-N_4$ number of bits are 0s. The UE can further assume the k-th bit ($1 \leq k \leq N_4$) in the first and/or second bitmap corresponds to a candidate SS/PBCH block location with candidate SS/PBCH block index as $m \cdot N_4+k-1$, wherein m is a non-negative integer with $m \cdot N_4+k-1 \leq N_{1\_1}$. If the k-th bit in the first bitmap takes a value of 1, the UE assumes at least one of the SS/PBCH blocks with candidate SS/PBCH block index $m \cdot N_4+k-1$ can be transmitted by the gNB; and if the k-th bit in the first bitmap takes a value of 0, the UE assumes all the SS/PBCH blocks with candidate SS/PBCH block index $m \cdot N_4+k-1$ are not transmitted by the gNB. If the k-th bit in the second bitmap takes a value of 1, the UE assumes at least one of the SS/PBCH blocks with candidate SS/PBCH block index $m \cdot N_4+k-1$ could be measured; and if the k-th bit in the second bitmap takes a value of 0, the UE assumes all the SS/PBCH blocks with candidate SS/PBCH block index $m \cdot N_4+k-1$ are not to be measured.

In one sub-example, $N_4$ can be indicated in MIB or SIB1. In another sub-example, $N_4$ can be indicated in higher layer parameter. In one example of the configurable value of $N_4$, $N_4$ can be from the set or a subset of $\{1, 2, 4, 8, 16, 32, 64\}$. In another example of the configurable value of $N_4$, $N_4$ can be from the set or a subset of $\{1, 2, 4, 8, 16, 32, 64, 80\}$.

In yet another example, for the SCS of SS/PBCH block as 240 kHz or 480 kHz or 960 kHz, there can be $N_1$=160 or 320 or 640 candidate SS/PBCH block locations within a half frame, correspondingly. A UE can be configured with a first bitmap and/or a second bitmap, wherein both bitmap are with length $N_2$=128. The UE assumes at most $N_3$=64 bits in the first and/or second bitmap can take a value of 1.

The UE can be further configured with a value of $N_4$ associated with either of the bitmaps, such that SS/PBCK blocks with the candidate SS/PBCH block index ī are QCLed, if mod(ī, $N_4$) is the same for those SS/PBCH blocks. If $N_4$ is provided to the UE, the UE assumes only the first $N_4$ bits in the first and/or second bitmap with length $N_2$ could take a value of 1, and the last $N_2-N_4$ number of bits are 0s.

The UE can further assume the k-th bit ($1 \leq k \leq N_4$) in the first and/or second bitmap corresponds to a candidate SS/PBCH block location with candidate SS/PBCH block index as $m \cdot N_4+k-1$, wherein m is a non-negative integer with $m \cdot N_4+k-1 \leq N_1-1$. If the k-th bit in the first bitmap takes a value of 1, the UE assumes at least one of the SS/PBCH blocks with candidate SS/PBCH block index $m \cdot N_4+k-1$ can be transmitted by the gNB; and if the k-th bit in the first bitmap takes a value of 0, the UE assumes all the SS/PBCH blocks with candidate SS/PBCH block index $m \cdot N_4+k-1$ are not transmitted by the gNB. If the k-th bit in the second bitmap takes a value of 1, the UE assumes at least one of the SS/PBCH blocks with candidate SS/PBCH block index $m \cdot N_4+k-1$ could be measured; and if the k-th bit in the second bitmap takes a value of 0, the UE assumes all the SS/PBCH blocks with candidate SS/PBCH block index $m \cdot N_4+k-1$ are not to be measured.

In one sub-example, $N_4$ can be indicated in MIB or SIB1. In another sub-example, $N_4$ can be indicated in higher layer parameter. In one example of the configurable value of $N_4$, $N_4$ can be from the set or a subset of $\{1, 2, 4, 8, 16, 32, 64\}$. In another example of the configurable value of $N_4$, $N_4$ can be from the set or a subset of $\{1, 2, 4, 8, 16, 32, 64, 128\}$.

Figure 7:
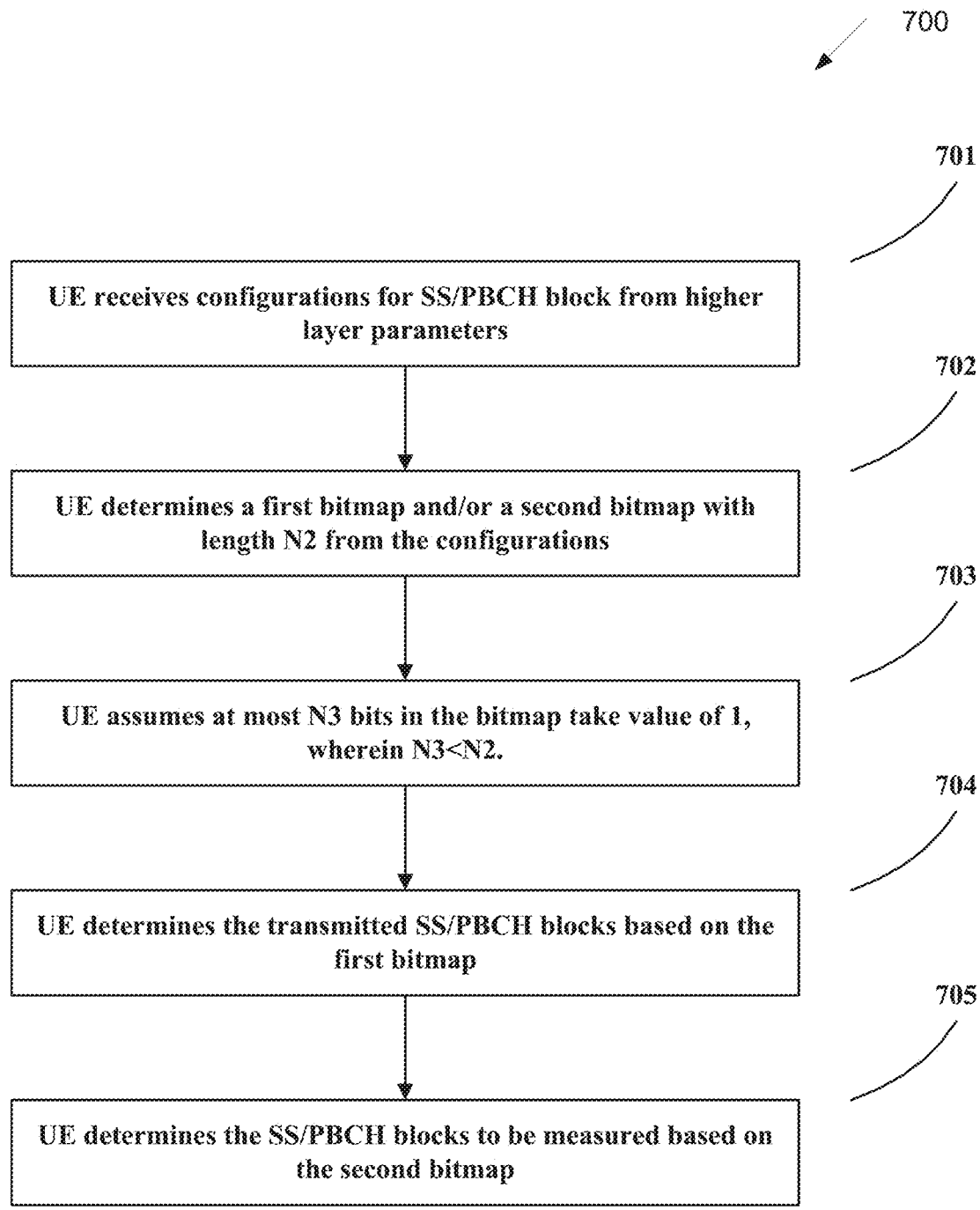
FIG. 7 illustrate a flowchart of UE method for SS/PBCH block indication according to embodiments of the present disclosure.

FIG. 7 illustrate a flowchart of UE method 700 for SS/PBCH block indication according to embodiments of the present disclosure. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In one embodiment, an example UE procedure based on the components in this disclosure is shown in FIG. 7. A UE receives configurations for SS/PBCH block from higher layer parameters (701 in FIG. 7), and then determines a first bitmap and/or a second bitmap from the configurations, wherein the first bitmap and/or the second bitmap are with length $N_2$ (702 in FIG. 7). The UE further assumes the number ($N_3$) of bits taking value of 1 in the first bitmap and/or the second bitmap is smaller than $N_2$ (703 in FIG. 7). The UE determines the set of transmitted SS/PBCH blocks based on the first bitmap (704 in FIG. 7), and/or determines the set of SS/PBCH blocks to be measured based on the second bitmap (705 in FIG. 7).

In one embodiment, the measurement time resources for NR carrier RSSI measurement are confined within the configured SMTC window duration, and the slots and OFDM symbols within the slots to perform NR carrier RSSI measurement can be configured by the higher layers. The configurations of the OFDM symbols within a configured slot, described by the ending symbol indexes provided by the higher layer parameter (e.g., endSymbol in SS-RSSI-Measurement), may try to cover all possible symbols for DL transmission including symbol(s) for SS/PBCH block in the slot.

In one example, for the two candidate SS/PBCH blocks within a slot starting from OFDM symbols #$N_1$ and #$N_2$, respectively, the configurable symbol indexes for NR carrier RSSI measurement, described by ending symbol (e.g., endSymbol in SS-RSSI-Measurement), can be from TABLE 30.

TABLE 30

Symbols for NR carrier RSSI measurement

| endSymbol | Symbol indexes for NR carrier RSSI measurement |
|---|---|
| 0 | $\{0, \ldots, N_1 - 1\}$ |
| 1 | $\{0, \ldots, N_1 + 3\}$ |
| 2 | $\{0, \ldots, N_2 - 1\}$ |
| 3 | $\{0, \ldots, N_2 + 3\}$ |

Figure 8:
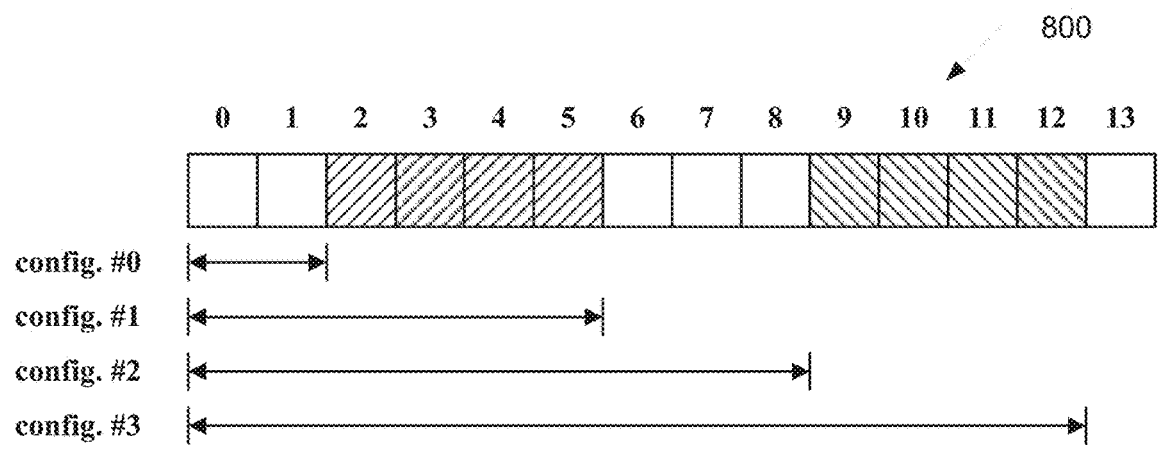
FIG. 8 illustrates an example of symbols to perform NR carrier RSSI measurement according to embodiments of the present disclosure.

FIG. 8 illustrates an example of symbols to perform NR carrier RSSI measurement 800 according to embodiments of the present disclosure. An embodiment of the symbols to perform NR carrier RSSI measurement 800 shown in FIG. 8 is for illustration only.

For one instance, for 480 kHz and/or 960 kHz subcarrier spacing, for the two candidate SS/PBCH blocks within a slot starting from OFDM symbols #2 and #9, respectively (as shown in FIG. 8), the configurable symbol indexes for NR carrier RSSI measurement, described by ending symbol (e.g., endSymbol in SS-RSSI-Measurement), can be from TABLE 31.

TABLE 31

Symbols for NR carrier RSSI measurement
for 480 kHz and/or 960 kHz

| endSymbol | Symbol indexes for NR carrier RSSI measurement |
|---|---|
| 0 | $\{0, 1\}$ |
| 1 | $\{0, 1, \ldots, 5\}$ |
| 2 | $\{0, 1, \ldots, 8\}$ |
| 3 | $\{0, 1, \ldots, 12\}$ |

In another example, for the two candidate SS/PBCH blocks within a slot starting from OFDM symbols #$N_1$ and #$N_2$, respectively, the configurable symbol indexes for NR carrier RSSI measurement, described by ending symbol (e.g., endSymbol in SS-RSSI-Measurement), can be from TABLE 32.

TABLE 32

Symbols for NR carrier RSSI measurement

| endSymbol | Symbol indexes for NR carrier RSSI measurement |
|---|---|
| 0 | $\{0, \ldots, N_1 - 1\}$ |
| 1 | $\{0, \ldots, N_1 + 3\}$ |
| 2 | $\{0, \ldots, N_2 - 2\}$ |
| 3 | $\{0, \ldots, N_2 + 3\}$ |

Figure 9:
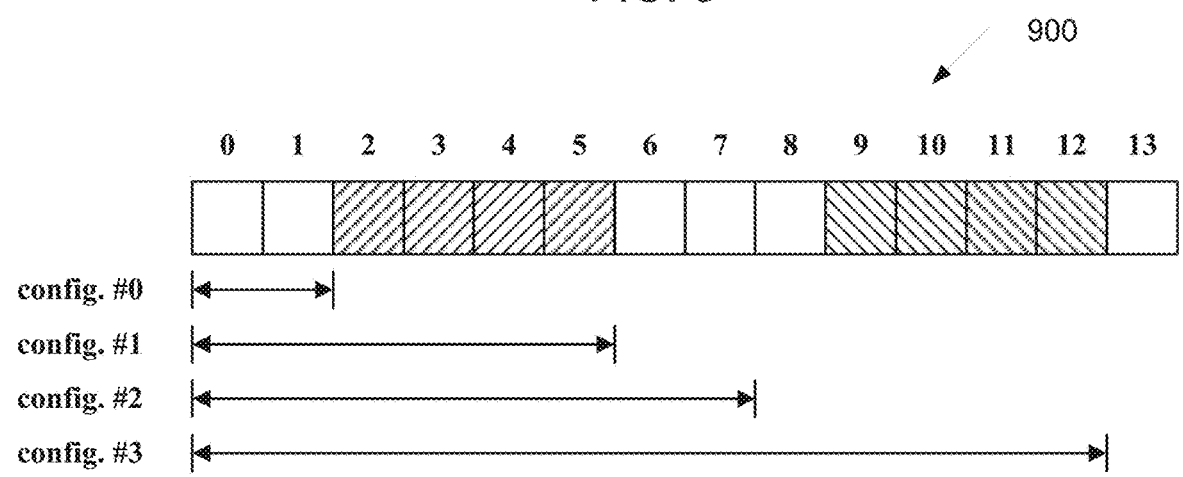
FIG. 9 illustrates another example of symbols to perform NR carrier RSSI measurement according to embodiments of the present disclosure.

FIG. 9 illustrates another example of symbols to perform NR carrier RSSI measurement 900 according to embodiments of the present disclosure. An embodiment of the symbols to perform NR carrier RSSI measurement 900 shown in FIG. 9 is for illustration only.

For one instance, for 480 kHz and/or 960 kHz subcarrier spacing, for the two candidate SS/PBCH blocks within a slot starting from OFDM symbols #2 and #9, respectively (as shown in FIG. 9), the configurable symbol indexes for NR carrier RSSI measurement, described by ending symbol (e.g., endSymbol in SS-RSSI-Measurement), can be from TABLE 33.

TABLE 33

Symbols for NR carrier RSSI measurement
for 480 kHz and/or 960 kHz

| endSymbol | Symbol indexes for NR carrier RSSI measurement |
|---|---|
| 0 | $\{0, 1\}$ |
| 1 | $\{0, 1, \ldots, 5\}$ |
| 2 | $\{0, 1, \ldots, 7\}$ |
| 3 | $\{0, 1, \ldots, 12\}$ |

In yet another example, for the two candidate SS/PBCH blocks within a slot starting from OFDM symbols #$N_1$ and #$N_2$, respectively, the configurable symbol indexes for NR carrier RSSI measurement, described by ending symbol (e.g., endSymbol in SS-RSSI-Measurement), can be from Table 34.

TABLE 34

Symbols for NR carrier RSSI measurement

| endSymbol | Symbol indexes for NR carrier RSSI measurement |
|---|---|
| 0 | $\{0, \ldots, N_1 - 1\}$ |
| 1 | $\{0, \ldots, N_1 + 3\}$ |

TABLE 34-continued

Symbols for NR carrier RSSI measurement

| endSymbol | Symbol indexes for NR carrier RSSI measurement |
|---|---|
| 2 | $\{0, \ldots, N_2 - 2\}$ |
| 3 | $\{0, \ldots, 13\}$ |

Figure 10:
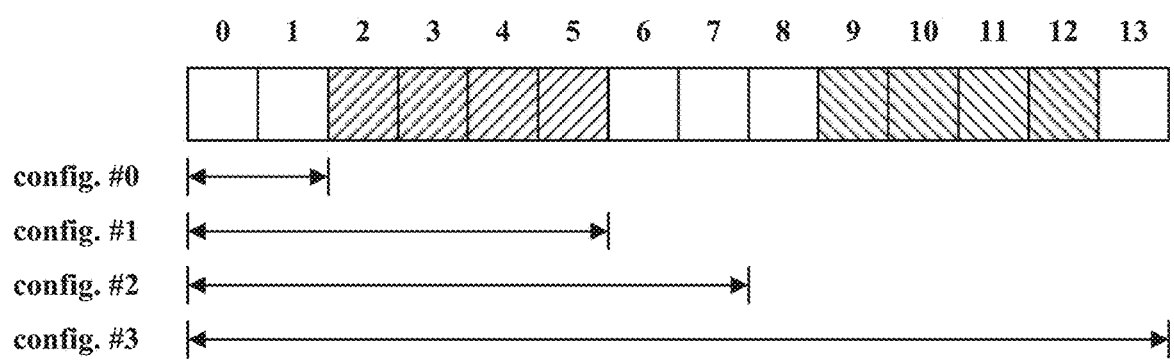
FIG. 10 illustrates yet another example of symbols to perform NR carrier RSSI measurement according to embodiments of the present disclosure.

FIG. 10 illustrates yet another example of symbols to perform NR carrier RSSI measurement 1000 according to embodiments of the present disclosure. An embodiment of the symbols to perform NR carrier RSSI measurement 1000 shown in FIG. 10 is for illustration only.

For one instance, for 480 kHz and/or 960 kHz subcarrier spacing, for the two candidate SS/PBCH blocks within a slot starting from OFDM symbols #2 and #9, respectively (as shown in FIG. 10), the configurable symbol indexes for NR carrier RSSI measurement, described by ending symbol (e.g., endSymbol in SS-RSSI-Measurement), can be from TABLE 35.

TABLE 35

Symbols for NR carrier RSSI measurement for 480 kHz and/or 960 kHz

| endSymbol | Symbol indexes for NR carrier RSSI measurement |
|---|---|
| 0 | $\{0, 1\}$ |
| 1 | $\{0, 1, \ldots, 5\}$ |
| 2 | $\{0, 1, \ldots, 7\}$ |
| 3 | $\{0, 1, \ldots, 13\}$ |

In one embodiment, at least in carrier frequency range 2-2 (FR2-2), discovery burst transmission window (DBTW) is not supported for operation without shared spectrum channel access, and a UE interprets the field(s) in master information block (MIB) differently from operation with shared spectrum channel access.

For one example, for operation without shared spectrum channel access at least in FR2-2, a UE assumes the field subCarrierSpacingCommon in MIB is reserved.

For another example, for operation without shared spectrum channel access at least in FR2-2, a UE assumes the field spare in MIB is reserved.

For yet another example, for operation without shared spectrum channel access at least in FR2-2, a UE assumes the field subCarrierSpacingCommon in MIB takes a fixed value, e.g., subCarrierSpacingCommon is provided as "scs15or60".

For yet another example, for operation without shared spectrum channel access at least in FR2-2, a UE assumes the field subCarrierSpacingCommon in MIB takes a fixed value, e.g., subCarrierSpacingCommon is provided as "scs30or120".

For yet another example, for operation without shared spectrum channel access at least in FR2-2, a UE assumes the field spare in MIB takes a fixed value, e.g., spare is provided as "0".

For yet another example, for operation without shared spectrum channel access at least in FR2-2, a UE assumes the field spare in MIB takes a fixed value, e.g., spare is provided as "1".

For yet another example, for operation without shared spectrum channel access at least in FR2-2, a UE assumes the fields subCarrierSpacingCommon and spare in MIB take fixed values, e.g., subCarrierSpacingCommon is provided as "scs15 or60", and spare is provided as "0".

For yet another example, for operation without shared spectrum channel access at least in FR2-2, a UE assumes the fields subCarrierSpacingCommon and spare in MIB take fixed values, e.g., subCarrierSpacingCommon is provided as "scs15 or60", and spare is provided as "1".

For yet another example, for operation without shared spectrum channel access at least in FR2-2, a UE assumes the fields subCarrierSpacingCommon and spare in MIB take fixed values, e.g., subCarrierSpacingCommon is provided as "scs30or120", and spare is provided as "0".

For yet another example, for operation without shared spectrum channel access at least in FR2-2, a UE assumes the fields subCarrierSpacingCommon and spare in MIB take fixed values, e.g., subCarrierSpacingCommon is provided as "scs30or120", and spare is provided as "1".

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
a processor configured to determine a set of configurations for a Type0-physical downlink control channel (Type0-PDCCH) common search space (CSS) set associated with a control resource set with an index 0 (CORESET #0), wherein the set of configurations include:
a subcarrier spacing (SCS) of the CORESET #0 that is same as a SCS of a synchronization signals and physical broadcast channel (SS/PBCH) block,
a multiplexing pattern between the CORESET #0 and the SS/PBCH block,
a parameter (O) associated with slots to transmit a PDCCH, and
an index of a first symbol of the CORESET #0 within at least one of the slots to transmit the PDCCH, and
wherein, in case that the multiplexing pattern is a first multiplexing pattern, a value of the parameter (O) is one of values {0, 5, X, 5+X}, where X is determined based on the SCS of the CORESET #0; and
a transceiver operably coupled to the processor, the transceiver configured to:
transmit the SS/PBCH block; and
transmit the PDCCH in the Type0-PDCCH CSS set based on the set of configurations.

2. The BS of claim 1, wherein:
in case that the SCS of the CORESET #0 is 480 kilohertz (kHz), X=1.25; and
in case that the SCS of the CORESET #0 is 960 kHz, X=0.625.

3. The BS of claim 1, wherein, in case that the first multiplexing pattern is the first multiplexing pattern, indexes of the slots to transmit the PDCCH are:
- $n_0$ and $n_0+4$, for the SCS of the CORESET #0 being 480 kHz; and
- $n_0$ and $n_0+8$, for the SCS of the CORESET #0 being 960 kHz, where $n_0$ is determined based on the parameter (O).

4. The BS of claim 1, wherein in case that the multiplexing pattern is a second multiplexing and the SCS of the SS/PBCH block is 480 kHz or 960 kHz, the index of the first symbol within the at least one of the slots to transmit the PDCCH is 2 or 9 based on an index of the SS/PBCH block.

5. The BS of claim 1, wherein:
the processor is further configured to determine configurations of a time domain resource allocation for a physical downlink shared channel (PDSCH), and
in case that the SCS of the SS/PBCH block is 480 kHz or 960 kHz and indexes of first symbols of candidate SS/PBCH blocks in a slot are 2 and 9, the configurations include:
- a type-A de-modulation reference signal (DM-RS) position configured as 2 or 3,
- a PDSCH mapping type configured as type-B,
- a $K_0$ value configured as 0,
- a starting symbol index S configured as 11, and
- a length of symbols configured as 2.

6. The BS of claim 1, wherein the processor is further configured to determine a set of symbols in a slot for a new radio (NR) carrier received signal strength indicator (RSSI) measurement, wherein indexes of the set of symbols are {0, 1, ..., 12} for the SCS of the SS/PBCH block being 480 kHz or 960 kHz.

7. A user equipment (UE) in a wireless communication system, the UE comprising:
a transceiver configured to receive, from a base station (BS), a synchronization signals and physical broadcast channel (SS/PBCH) block; and
a processor operably coupled to the transceiver, the processor configured to determine a set of configurations for a Type0-physical downlink control channel (Type0-PDCCH) common search space (CSS) set associated with a control resource set with an index 0 (CORESET #0), wherein the set of configurations include:
- a subcarrier spacing (SCS) of the CORESET #0 that is same as a SCS of the SS/PBCH block,
- a multiplexing pattern between the CORESET #0 and the SS/PBCH block,
- a parameter (O) associated with slots to transmit a PDCCH, and
- an index of a first symbol of the CORESET #0 within at least one of the slots to transmit the PDCCH, wherein, in case that the multiplexing pattern is a first multiplexing pattern, a value of the parameter (O) is one of values {0, 5, X, 5+X}, where X is determined based on the SCS of the CORESET #0; and
wherein the transceiver is further configured to receive the PDCCH in the Type0-PDCCH CSS set based on the set of configurations.

8. The UE of claim 7, wherein:
in case that the SCS of the CORESET #0 is 480 kilohertz (kHz), X=1.25; and
in case that the SCS of the CORESET #0 is 960 kHz, X=0.625.

9. The UE of claim 7, wherein, in case that the first multiplexing pattern is the first multiplexing pattern, indexes of the slots to transmit the PDCCH are:
- $n_0$ and $n_0+4$, for the SCS of the CORESET #0 being 480 kHz; and
- $n_0$ and $n_0+8$, for the SCS of the CORESET #0 being 960 kHz, where $n_0$ is determined based on the parameter (O).

10. The UE of claim 7, wherein in case that the multiplexing pattern is a second multiplexing and the SCS of the SS/PBCH block is 480 kHz or 960 kHz, index of the first symbol within the at least one of the slots to transmit the PDCCH is 2 or 9 based on an index of the SS/PBCH block.

11. The UE of claim 7, wherein:
the processor is further configured to identify configurations of time domain resource allocation for a physical downlink shared channel (PDSCH), and
in case that the SCS of the SS/PBCH block is 480 kHz or 960 kHz and indexes of first symbols of candidate SS/PBCH blocks in a slot are 2 and 9, the configurations include:
- a type-A de-modulation reference signal (DM-RS) position configured as 2 or 3,
- a PDSCH mapping type configured as type-B,
- a $K_0$ value configured as 0,
- a starting symbol index S configured as 11, and
- a length of symbols configured as 2.

12. The UE of claim 7, wherein the processor is further configured to identify a set of symbols in a slot for a new radio (NR) carrier received signal strength indicator (RSSI) measurement, wherein indexes of the set of symbols are {0, 1, ..., 12} for the SCS of the SS/PBCH block being 480 kHz or 960 kHz.

13. A method of operating a user equipment (UE) in a wireless communication system, the method comprising:
receiving, from a base station (BS), a synchronization signals and physical broadcast channel (SS/PBCH) block;
determining a set of configurations for a Type0-physical downlink control channel (Type0-PDCCH) common search space (CSS) set associated with a control resource set with an index 0 (CORESET #0), wherein the set of configurations include:
- a subcarrier spacing (SCS) of the CORESET #0 that is same as a SCS of the SS/PBCH block,
- a multiplexing pattern between the CORESET #0 and the SS/PBCH block,
- a parameter (O) associated with slots to transmit a PDCCH, and
- an index of a first symbol of the CORESET #0 within at least one of the slots to transmit the PDCCH, and wherein, in case that the multiplexing pattern is a first multiplexing pattern, a value of the parameter (O) is one of values {0, 5, X, 5+X}, where X is determined based on the SCS of the CORESET #0; and
receiving the PDCCH in the Type0-PDCCH CSS set based on the set of configurations.

14. The method of claim 13, wherein:
in case that the SCS of the CORESET #0 is 480 kilohertz (kHz), X=1.25; and
in case that the SCS of the CORESET #0 is 960 kHz, X=0.625.

15. The method of claim 13, wherein, in case that the first multiplexing pattern is the first multiplexing pattern, indexes of the slots to transmit the PDCCH are:
- $n_0$ and $n_0+4$, for the SCS of the CORESET #0 being 480 kHz; and
- $n_0$ and $n_0+8$, for the SCS of the CORESET #0 being 960 kHz, where $n_0$ is determined based on the parameter (O).

16. The method of claim 13, wherein in case that the multiplexing pattern is a second multiplexing and the SCS of the SS/PBCH block is 480 kHz or 960 kHz, index of the first symbol within the at least one of the slots to transmit the PDCCH is 2 or 9 based on an index of the SS/PBCH block.

17. The method of claim 13, further comprising:
identifying configurations of time domain resource allocation for a physical downlink shared channel (PDSCH),
wherein, in case that the SCS of the SS/PBCH block is 480 kHz or 960 kHz and indexes of first symbols of candidate SS/PBCH blocks in a slot are 2 and 9, the configurations include:
a type-A de-modulation reference signal (DM-RS) position configured as 2 or 3,
a PDSCH mapping type configured as type-B,
a $K_0$ value configured as 0,
a starting symbol index S configured as 11, and
a length of symbols configured as 2.

18. The method of claim 13, further comprising identifying a set of symbols in a slot for a new radio (NR) carrier received signal strength indicator (RSSI) measurement, wherein indexes of the set of symbols are $\{0, 1, \ldots, 12\}$ for the SCS of the SS/PBCH block being 480 kHz or 960 kHz.

\* \* \* \* \*